(12) United States Patent
Itoh et al.

(10) Patent No.: US 11,528,376 B2
(45) Date of Patent: Dec. 13, 2022

(54) SHEET ALIGNMENT APPARATUS, POST-PROCESSING APPARATUS, AND IMAGE FORMING SYSTEM

(71) Applicants: Shigeyuki Itoh, Kanagawa (JP); Ikumi Takashima, Kanagawa (JP)

(72) Inventors: Shigeyuki Itoh, Kanagawa (JP); Ikumi Takashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/240,130

(22) Filed: Apr. 26, 2021

(65) Prior Publication Data
US 2021/0337079 A1   Oct. 28, 2021

(30) Foreign Application Priority Data
Apr. 28, 2020   (JP) .............................. JP2020-079471

(51) Int. Cl.
*H04N 1/00*   (2006.01)

(52) U.S. Cl.
CPC ....... *H04N 1/00639* (2013.01); *H04N 1/0066* (2013.01)

(58) Field of Classification Search
CPC ................................................ H04N 1/00639
USPC ........................................................ 358/1.12
See application file for complete search history.

(56) References Cited

U.S. PATENT DOCUMENTS

| 6,302,606 B1* | 10/2001 | Hayakawa | ............. B41J 13/106 |
| | | | 271/220 |
| 2005/0194730 A1 | 9/2005 | Nishida et al. | |
| 2010/0149299 A1 | 6/2010 | Nishida et al. | |
| 2010/0232912 A1* | 9/2010 | Hata | ........................ B42C 1/12 |
| | | | 234/128 |
| 2013/0161899 A1 | 6/2013 | Ito et al. | |

FOREIGN PATENT DOCUMENTS

| JP | 2016-069110 | 5/2016 |
| JP | 2017-071490 | 4/2017 |
| JP | 2020-083603 | 6/2020 |

\* cited by examiner

*Primary Examiner* — Jacky X Zheng
(74) *Attorney, Agent, or Firm* — Harness, Dickey & Pierce, P.L.C.

(57) ABSTRACT

A sheet alignment apparatus includes a sheet leading-end aligning device, a sheet side-end aligning device. The sheet leading-end aligning device is configured to align a leading end of a sheet bundle in a sheet conveyance direction. The sheet side-end aligning device is configured to align a side end of the sheet bundle in the sheet conveyance direction and move the sheet bundle to a predetermined position. The sheet leading-end aligning device is configured to maintain contact with the leading end of the sheet bundle when the sheet leading-end aligning device retracts from a movement path of the sheet side-end aligning device along which the sheet side-end aligning device moves the sheet bundle to the predetermined position.

15 Claims, 29 Drawing Sheets

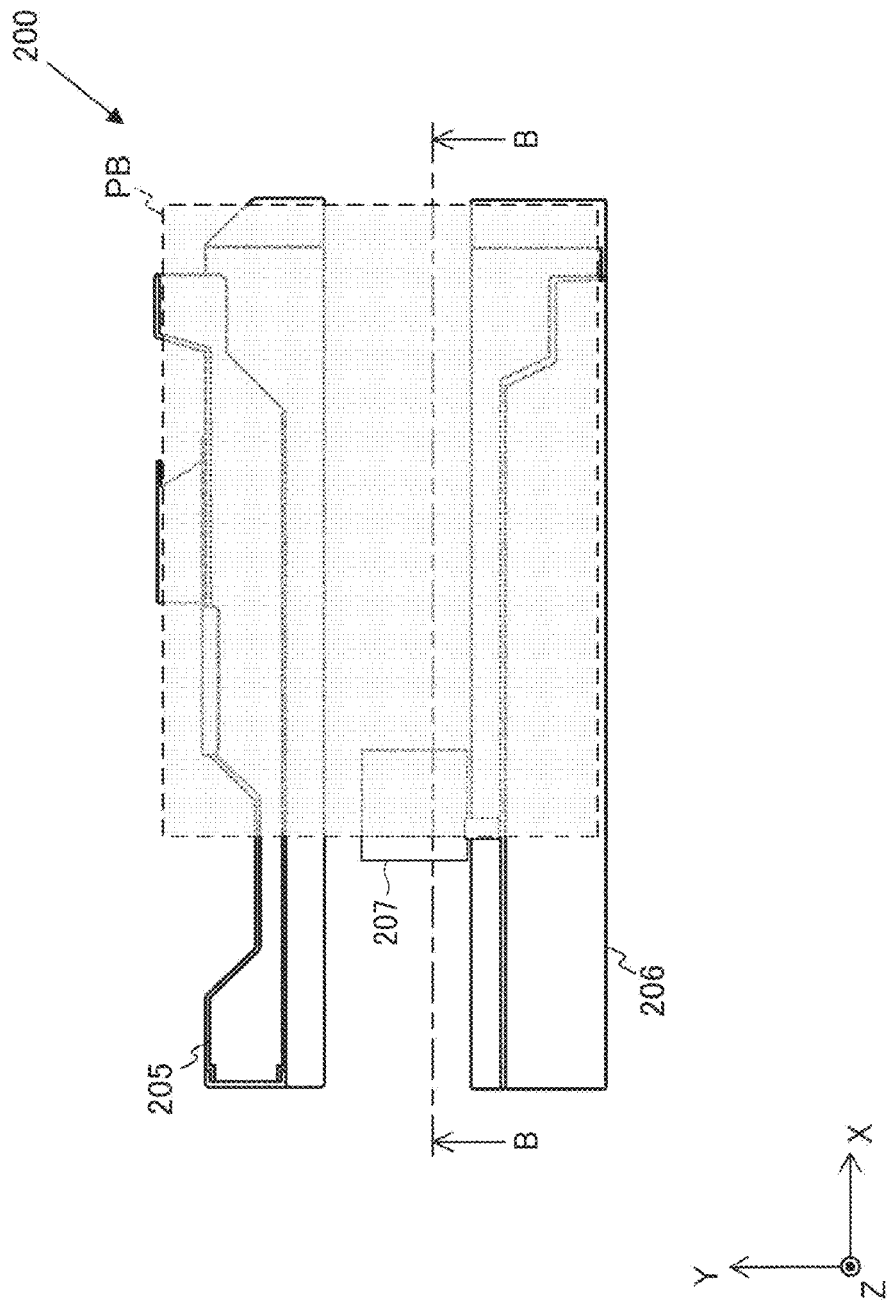

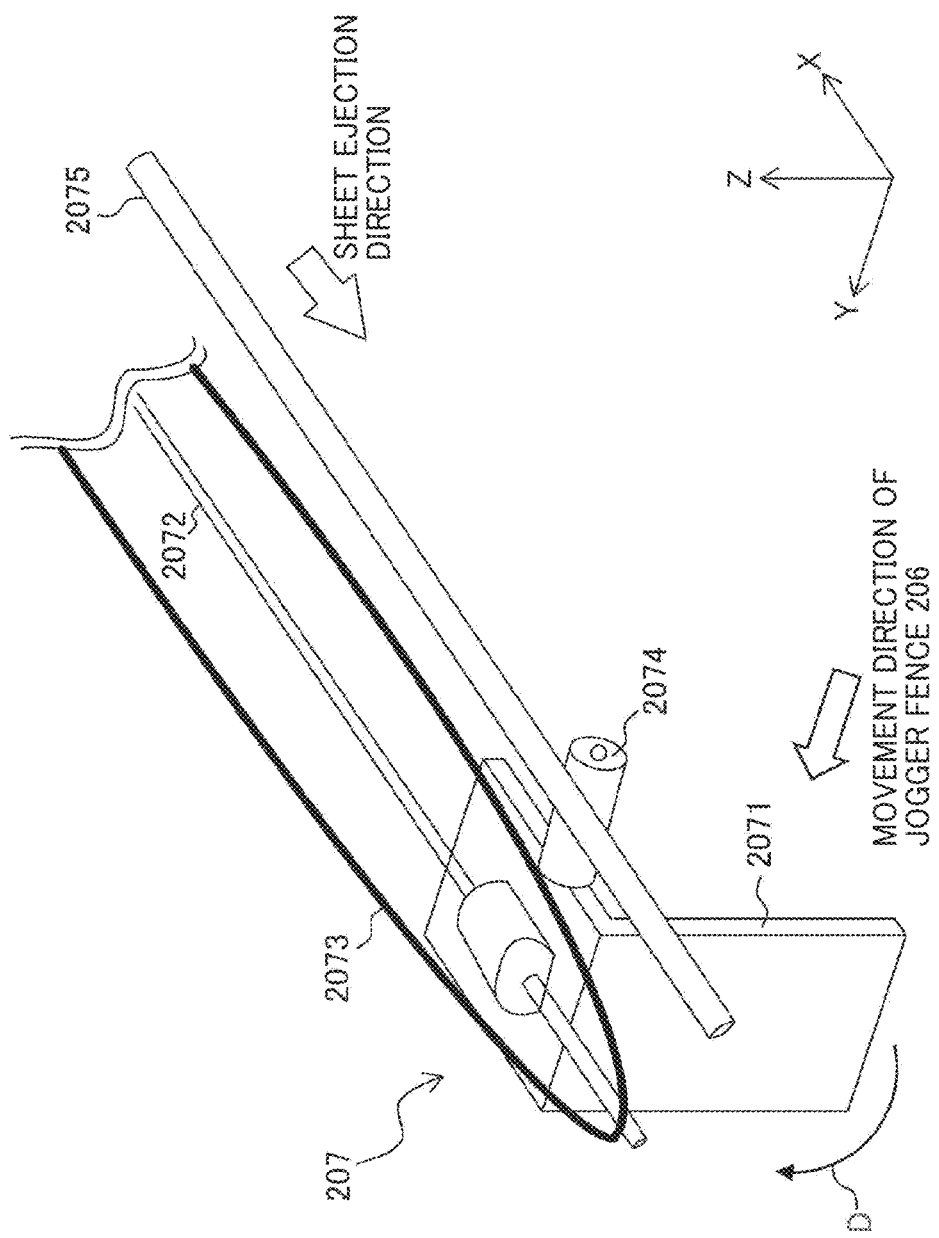

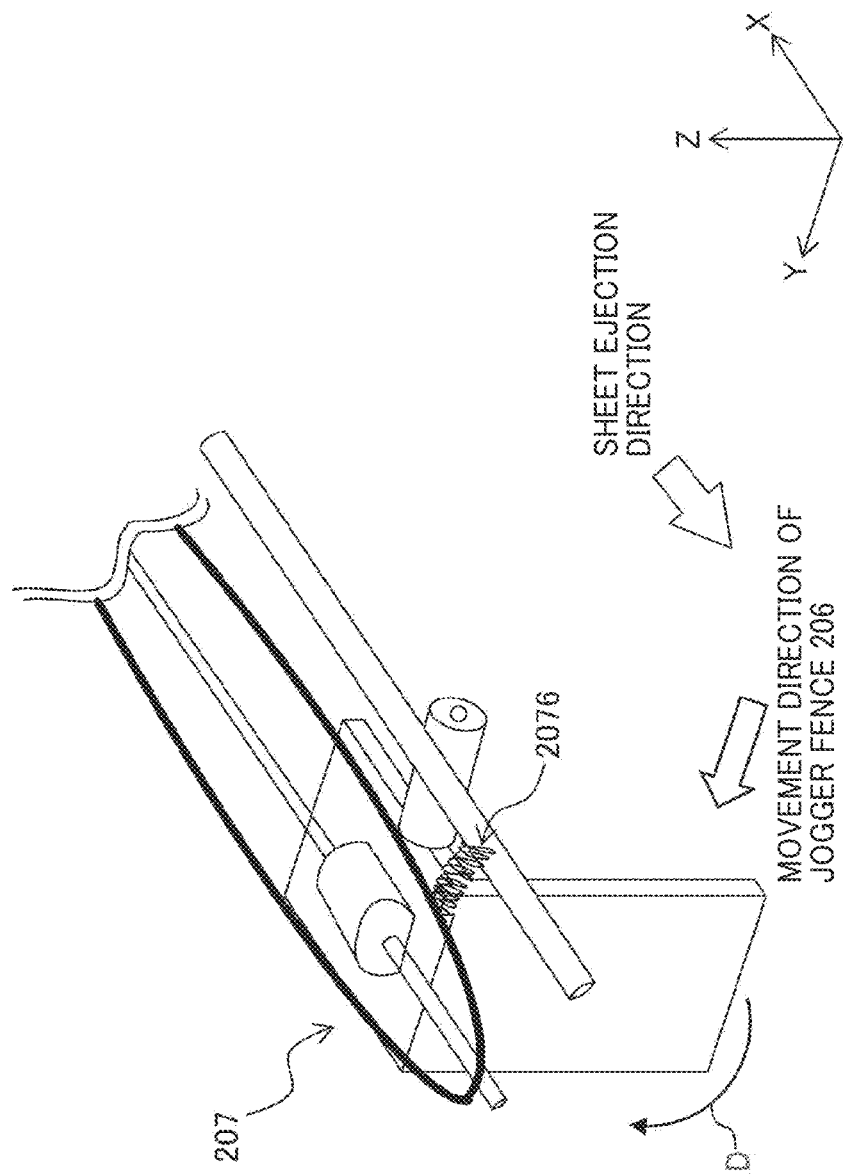

| FIG. 10A |
| FIG. 10B |

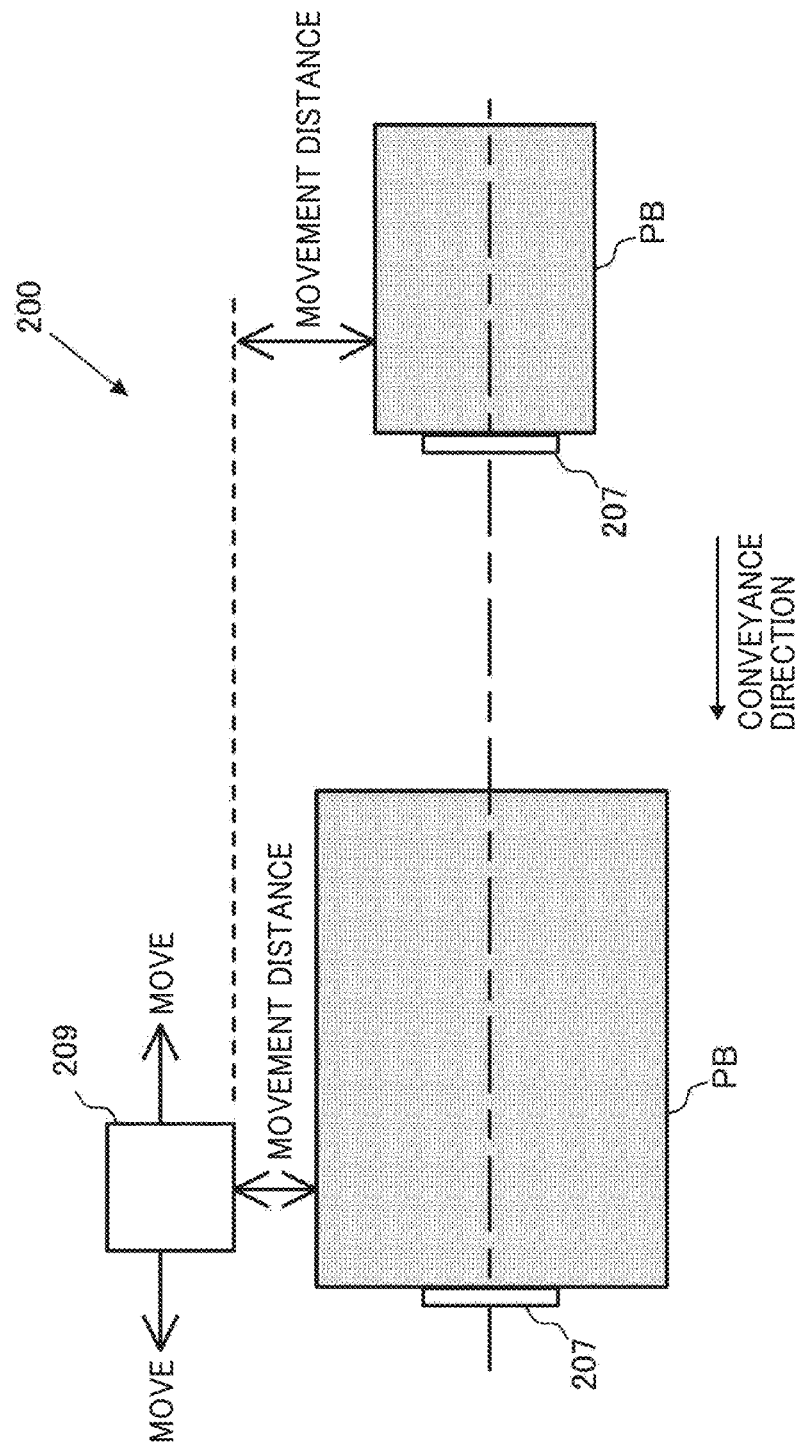

SHEET ALIGNMENT APPARATUS, POST-PROCESSING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-079471 filed on Apr. 28, 2020, in the Japan Patent Office, the entire disclosure of which is hereby incorporated by reference herein.

BACKGROUND

Technical Field

Embodiments of the present disclosure relate to a sheet alignment apparatus, a post processing apparatus, and an image forming system.

Description of the Related Art

There is known an image forming apparatus that forms an image on a sheet. There are also known a sheet alignment apparatus that aligns an end of a sheet on which an image has been formed in the image forming apparatus and a post-processing apparatus that performs post-processing such as binding processing on the end of the sheet aligned in the sheet alignment apparatus. There is known an image forming system as a system including a sheet alignment apparatus and a post-processing apparatus or a system configured by connecting the sheet alignment apparatus and the post-processing apparatus.

SUMMARY

In an aspect of the present disclosure, a sheet alignment apparatus includes a sheet leading-end aligning device, a sheet side-end aligning device. The sheet leading-end aligning device is configured to align a leading end of a sheet bundle in a sheet conveyance direction. The sheet side-end aligning device is configured to align a side end of the sheet bundle in the sheet conveyance direction and move the sheet bundle to a predetermined position. The sheet leading-end aligning device is configured to maintain contact with the leading end of the sheet bundle when the sheet leading-end aligning device retracts from a movement path of the sheet side-end aligning device along which the sheet side-end aligning device moves the sheet bundle to the predetermined position.

In another aspect of the present disclosure, a post-processing apparatus includes a binding device, the sheet leading-end aligning device, and a sheet side-end aligning device. The binding device is configured to bind a leading end of a sheet bundle. The sheet side-end aligning device is configured to align a side end of the sheet bundle on a side facing the binding device and move the sheet bundle to a binding position of the binding device.

In still another aspect of the present disclosure, an image forming system includes an image forming device and the post-processing apparatus. The image forming device is configured to form an image on a surface of a sheet. The post-processing apparatus is configured to perform post-processing on the sheet on which the image has been formed by the image forming device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 8A and 8B are schematic views of the sheet alignment apparatus in a state in which a leading end of a sheet is aligned according to the first embodiment of the present disclosure:

FIGS. 9A and 9B are perspective views of a configuration of a leading end stopper according to the first embodiment of the present disclosure:

FIG. 24 is a top view of the sheet alignment apparatus and the post-processing apparatus in the stapling mode operation according to the first embodiment of the present disclosure.

Figure 1:
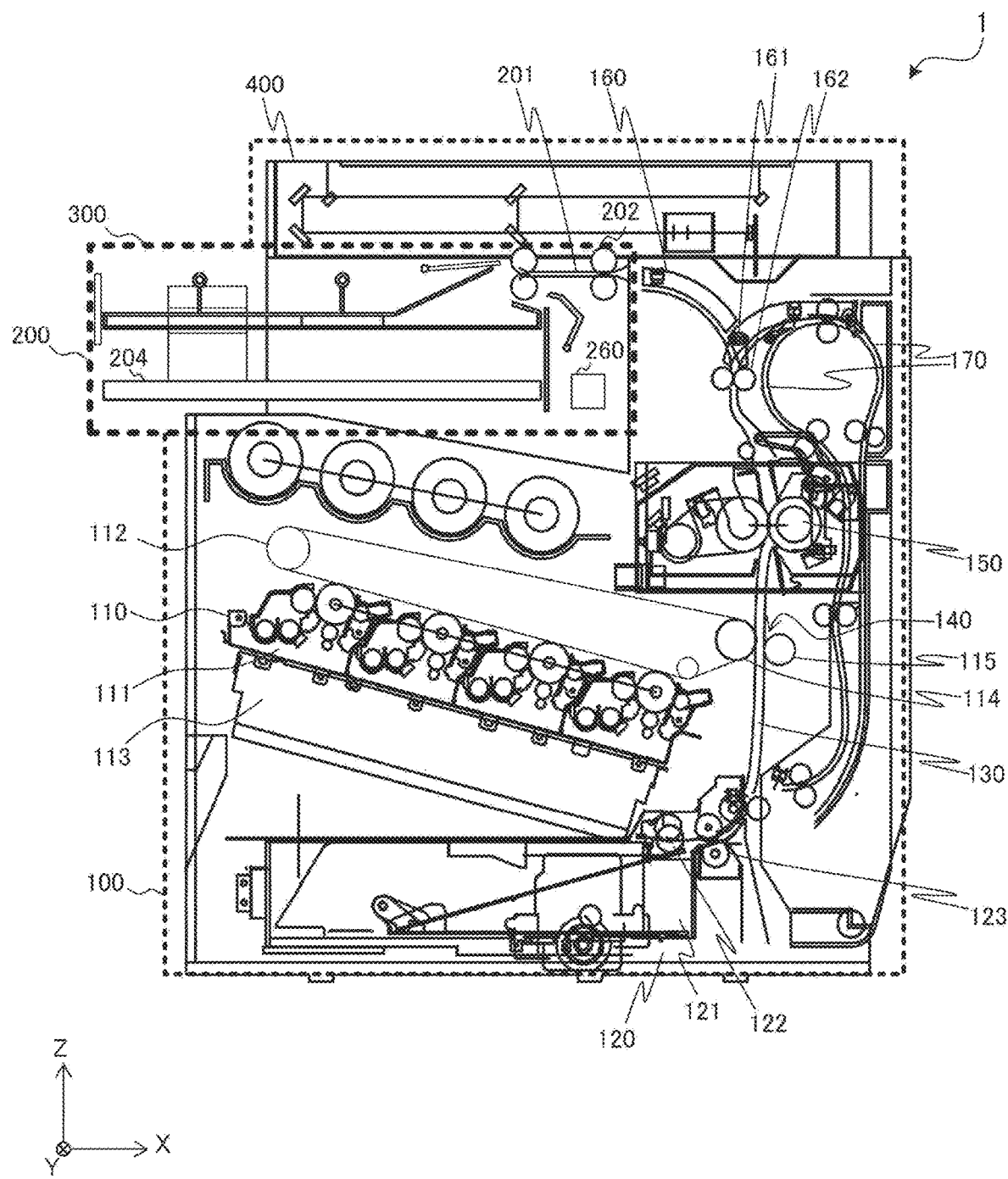
FIG. 1 is a schematic view of a configuration example of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a sheet alignment apparatus, a post-processing apparatus, and an image forming system according to embodiments are described with reference to the drawings. In the following descriptions, a paper medium is exemplified as an example of a sheet. However, for example, a sheet made of plastic, metal, or the like is also applicable.

Overall Configuration

FIG. 1 is a diagram of an outline of an image forming system according to an embodiment of the present disclosure. An image forming system 1 includes an image forming apparatus 100, a sheet alignment apparatus 200 having a sheet stacking function and a sheet aligning function, a post-processing apparatus 300 having a sheet binding function of performing binding processing on a sheet whose end is aligned in the sheet alignment apparatus 200, and an image reading apparatus 400.

The image forming apparatus 100 is an indirect transfer tandem type image forming unit that forms a color image, and functions as an image forming device that forms an image on a surface of a sheet as a sheet-shaped medium. The image forming apparatus 100 includes an image forming device 110 in which image forming stations 111 for four colors are disposed, and an optical writing device 113 provided below and adjacent to the image forming device 110. The image forming apparatus 100 includes a sheet feeder 120 provided below the image forming device 110, and a sheet feeding conveyance path 130 for guiding a sheet picked up by the sheet feeder 120 to be conveyed to a secondary transfer device 140 and a fixing device 150. The image forming apparatus 100 includes a sheet ejection path 160 for guiding a sheet on which an image has been fixed to convey the sheet to the post-processing apparatus 300, and a double-sided conveyance path 170 for reversing (switching back) a sheet on one side of which an image has been formed and guiding the sheet to the sheet feed conveyance path 130 for forming an image on the other side of the sheet.

Each of the image forming stations 111 of the image forming device 110 includes a photoconductor drum for each color of Y, M, C, and K, a charger, a developer, a primary transfer unit, a cleaner, a ejecting unit, and the like disposed along the outer circumference of the photoconductor drum. The image forming device 110 includes an intermediate transfer belt 112 to which an image formed on the photoconductor drum is transferred by the primary transfer unit, and an optical writing device 113 that writes an image on the photoconductor drum for each color. The optical writing device 113 is disposed below the image forming stations 111, and the intermediate transfer belt 112 is disposed above the image forming stations 111. The intermediate transfer belt 112 is rotatably supported by a plurality of support rollers. A support roller 114 as one of the support rollers faces a secondary transfer roller 115 as a secondary transfer unit via the intermediate transfer belt 112 in the secondary transfer device 140, and secondarily transfers an image on the intermediate transfer belt 112 onto a surface of a sheet. As such an image forming process, a known process other than the above-described process may be adopted.

The sheet feeder 120 includes a sheet feeding tray 121, a pickup roller 122, and a sheet feeding conveyance roller pair 123, and feeds a sheet picked up from the sheet feeding tray 121 upward along the sheet feeding conveyance path 130. An image is transferred to the fed sheet in the secondary transfer device 140, and the sheet is sent to the fixing device 150. The fixing device 150 includes a fixing roller and a pressure roller. In a process in which the sheet passes through a nip between the fixing roller and the pressure roller, heat and pressure are applied to the sheet and toner is fixed to the sheet.

The sheet ejection path 160 and the double-sided conveyance path 170 are provided downstream of the fixing device 150. A bifurcating claw 161 as a bifurcating member is switched so that the sheet is guided to one of the conveyance paths depending on a case in which the sheet is conveyed to the post-processing apparatus 300 and a case in which the sheet is conveyed to the double-sided conveyance path 170. Note that a bifurcating conveyance roller 162 is provided immediately upstream of the bifurcating claw 161 in the sheet conveyance direction to apply a conveyance force to the sheet.

The sheet alignment apparatus 200 performs predetermined processing (for example, alignment processing) on the image-formed sheet conveyed from the image forming apparatus 100, and stacks the sheet on the ejection tray 204 located at an extreme downstream position. Details of the sheet alignment apparatus 200 will be described later. The post-processing apparatus 300 performs predetermined post-processing (for example, binding processing) on an end of a sheet bundle PB on which the alignment processing has been performed on the image-formed sheets conveyed from the image forming apparatus 100, and stacks the sheet bundle PB on the ejection tray 204 positioned on extreme downstream in the sheet conveyance direction. Details of the post-processing apparatus 300 will be described later together with the description of the sheet alignment apparatus 200. When the image reading apparatus 400 is provided as illustrated in FIG. 1, the sheet alignment apparatus 200 and the post-processing apparatus 300 are mounted in a space formed in a housing of the image forming apparatus 100 between the image forming apparatus 100 and the image reading apparatus 400. The space is a space originally used as a sheet ejection destination. Such a configuration can achieve both space saving and reduction of an installation area.

A controller 260 disposed in the sheet alignment apparatus 200 is a board including, for example, a central processing unit, a main storage device, an auxiliary storage device, and the like, and is a device that operates each hardware by software processing. The controller 260 inputs detection signals indicating the presence or absence of a sheet from sensors installed in each conveyance path, performs conveyance control of the sheet in the sheet alignment apparatus 200 based on the detection signals, and performs operation control of each unit described later. Note that the image forming system 1 is controlled by a controller provided in the image forming apparatus 100 communicating with the controller 260. However, instead of such a configuration, each unit in the sheet alignment apparatus 200 and each processing unit in the post-processing apparatus 300 may be generally controlled.

The image reading apparatus 400 optically scans a document set on an exposure glass to read an image on a surface of the document. A known configuration and known functions may be employed as the configuration and functions of the image reading apparatus 400.

The image forming apparatus 100 configured as described above generates image data to be used for writing based on document data read by the image reading apparatus 400 or print data transferred from an external personal computer or the like. The optical writing device 113 performs optical writing on each of the photoconductor drums based on the image data, and the image formed for each color in each of the image forming stations 111 is sequentially transferred to the intermediate transfer belt 112. Thus, a color image in which images of four colors are superimposed is formed on the intermediate transfer belt 112. On the other hand, a sheet is fed from the sheet feed tray 121 in accordance with image formation. The sheet is temporarily stopped at a position of a registration roller right in front of the secondary transfer device 140 and sent out in synchronization with the leading end of the image on the intermediate transfer belt 112. Then, the sheet is secondarily transferred by the secondary transfer device 140 and sent to the fixing device 150.

The sheet on which the image has been fixed in the fixing device 150 is conveyed by the switching operation of the bifurcating claw 161 either to the sheet ejection path 160 or to the double-sided conveyance path 170. The sheet is conveyed to the sheet ejection path 160 in a case of single-sided printing and in a case of double-sided printing after both sides of the sheet are printed. The sheet is conveyed to the double-sided conveyance path 170 in the case of double-sided printing. The sheet conveyed to the double-sided conveyance path 170 is inverted and then sent again to the secondary transfer device 140, at which an image is formed on the other side of the sheet, and the sheet is conveyed to the sheet ejection path 160. The sheet conveyed to the sheet ejection path 160 is conveyed to the post-processing apparatus 300, subjected to predetermined processing such as binding processing by the post-processing apparatus 300, or ejected to the ejection tray 204 without processing.

Outline of Sheet Alignment Apparatus and Post-Processing Apparatus

Figure 2:
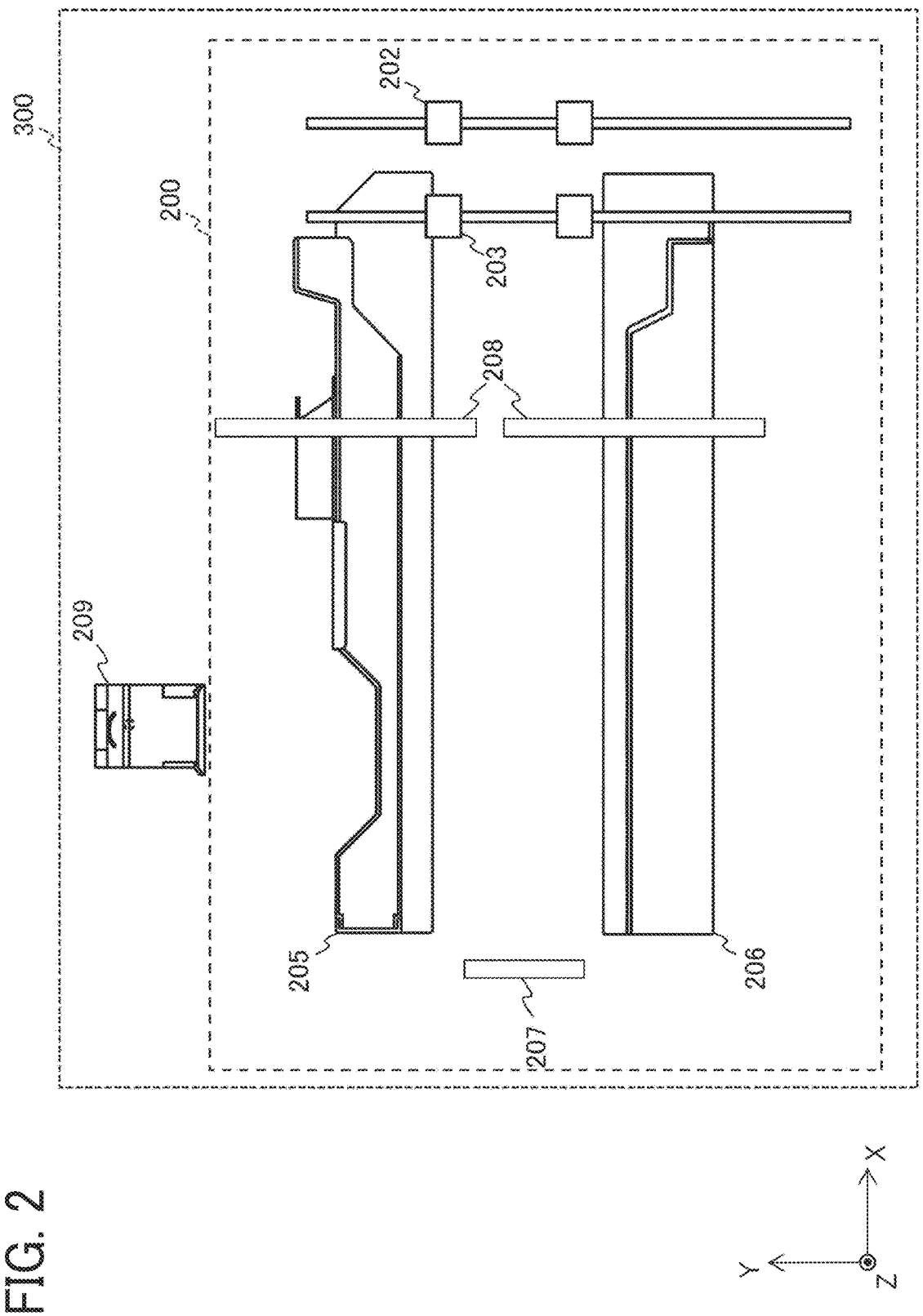
FIG. 2 is a top view of a sheet alignment apparatus and a post-processing apparatus according to an embodiment of the present disclosure.
Figure 3:
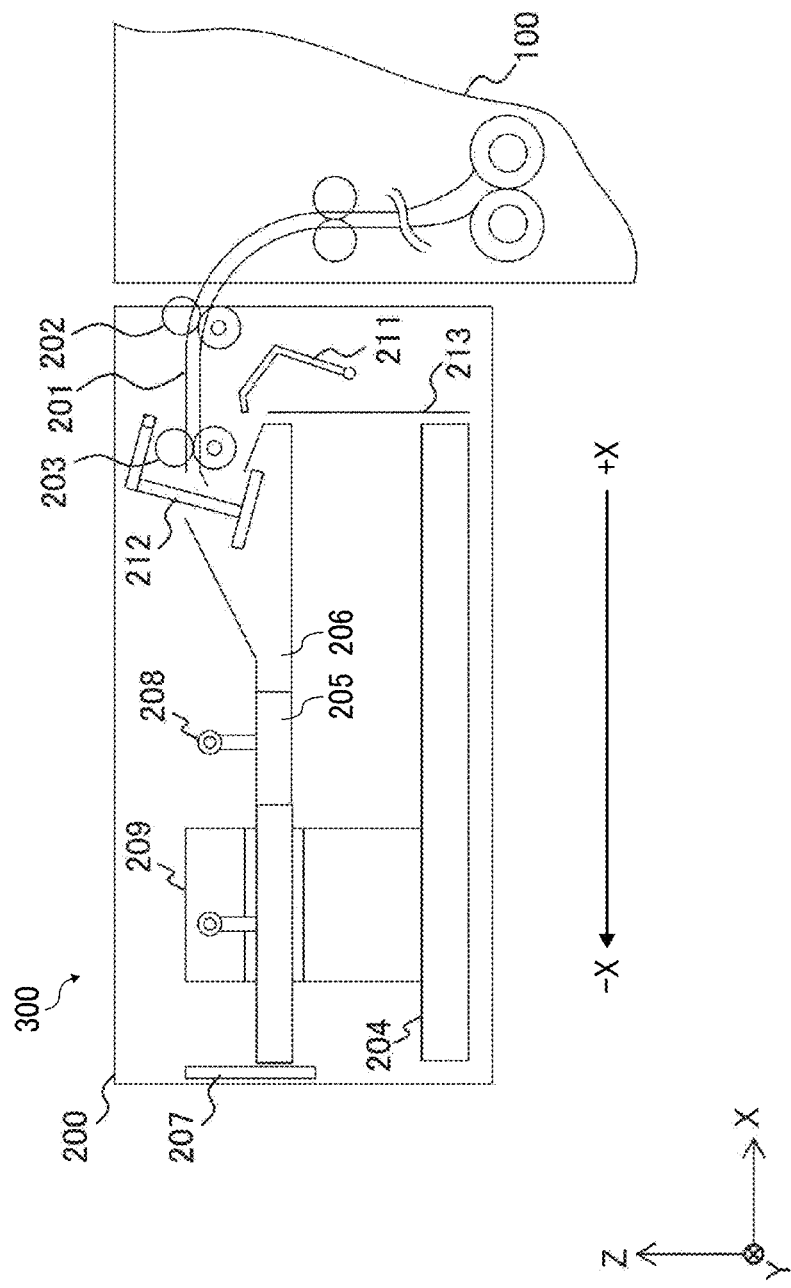
FIG. 3 is a side view of a sheet alignment apparatus and a post-processing apparatus according to an embodiment of the present disclosure.

FIG. 2 is a top view of the sheet alignment apparatus 200 and the post-processing apparatus 300. FIG. 3 is a side view of the sheet alignment apparatus 200. FIG. 2 and FIG. 3 each illustrates a basic configuration the sheet alignment apparatus 200 and the post-processing apparatus 300 applied to the present embodiment. In FIG. 3, the sheet alignment apparatus 200 and the post-processing apparatus 300 include, from upstream in the sheet conveyance direction, an inlet roller pair 202, a sheet surface detection feeler 211, a rear end reference fence 213, a sheet ejection roller pair 203, jogger fences 205 and 206, a guide shaft 208, a rear end guide 212, a leading end stopper 207, and an ejection tray 204. The jogger fences 205 and 206 are disposed on a back side and a front side as sheet aligning members for aligning side ends (ends) of the sheet bundle PB in the width direction. The post-processing apparatus 300 includes a stapler 209 (binding device) in addition to the configuration of the sheet alignment apparatus 200.

The jogger fences 205 and 206 serving as sheet side-end aligning device are supported by the guide shaft 208 and are movable in the axial direction of the guide shaft 208. The sheet is conveyed from the +X direction toward the −X direction. The leading end stopper 207 as a sheet leading end aligning unit that aligns the leading end of the sheet is provided downstream in the sheet conveyance direction.

A guide plate that receives a sheet from the sheet ejection conveyance path of the image forming apparatus 100 is disposed in a sheet receiving portion of the sheet alignment apparatus 200. The inlet roller pair 202 is disposed on an extreme upstream side of the guide plate in the sheet conveyance direction. The sheet ejection roller pair 203 having a function of shifting and ejecting the sheet to the ejection tray 204 is disposed on an extreme downstream side in the sheet conveyance direction. The inlet roller pair 202 and the sheet ejection roller pair 203 are rotated by the entrance motor. Accordingly, the sheet is conveyed in the sheet alignment apparatus 200 along the guide plate. Each of the jogger fences 205 and 206 includes a stacking unit to stack ends of the sheet in the width direction of the sheet ejected from the sheet ejection roller pair 203 and an alignment unit that contacts side ends of the sheet in the width direction of the stacked sheet to align the sheet in the width direction, and also functions as a stacking unit.

The sheet ejection operation of the sheet alignment apparatus 200 includes three modes: a shift mode, a straight sheet ejection mode, and a stapling mode. The shift mode shifts the sheet to a different position for each job and ejects the sheet. The straight sheet ejection mode discharges the sheet as it is. The stapling mode binds a plurality of sheets and ejects the sheets. The operations in the shift mode and the straight sheet ejection mode are the same as conventional operations. Accordingly, the configuration and the operation of each unit in the stapling mode are described below.

First Embodiment

The operation of the sheet alignment apparatus 200 in the stapling mode according to a first embodiment of the present disclosure is described below. The stapling mode is an operation mode for performing binding processing using the stapler 209. Therefore, after the alignment processing is performed in the sheet alignment apparatus 200, the binding processing by the stapler 209 is executed. The operation in the stapling mode described below is a series of operations in which the alignment processing is performed by the sheet alignment apparatus 200 and the binding processing is performed by the post-processing apparatus 300 after the alignment processing is performed.

Figure 4:
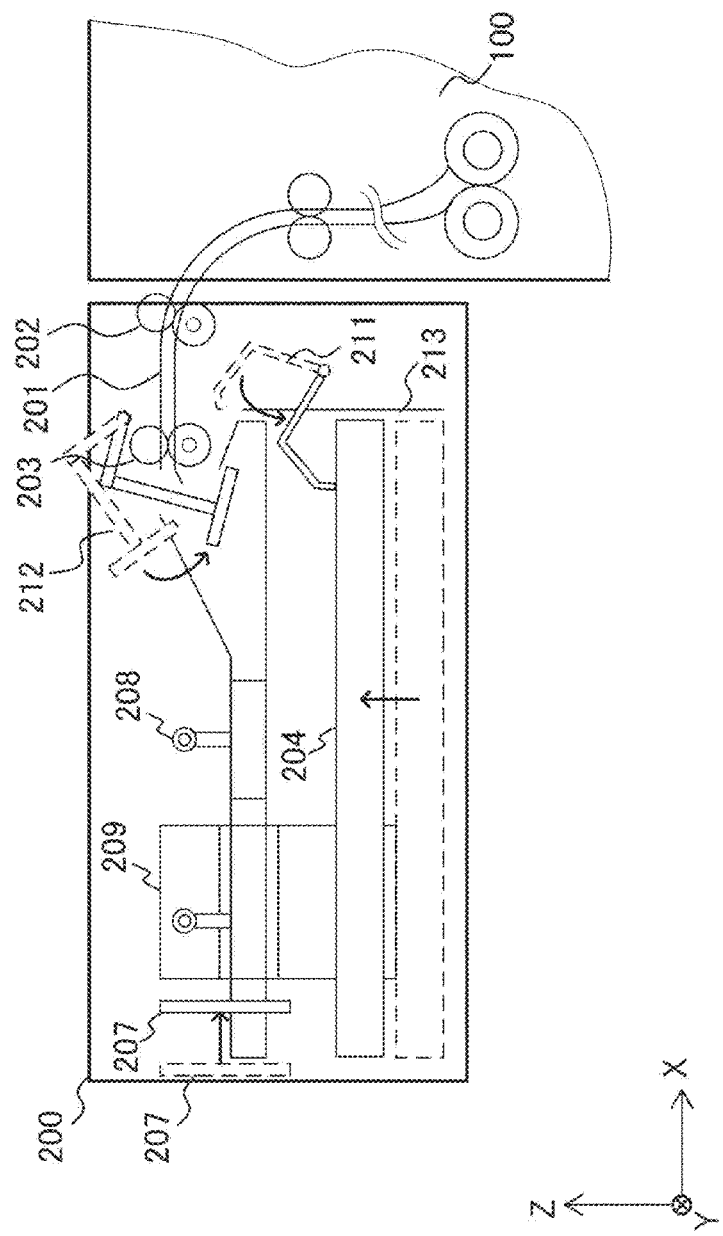
FIG. 4 is a side view of a sheet alignment apparatus and a post-processing apparatus in a stapling mode operation according to a first embodiment of the present disclosure.
Figure 5A:
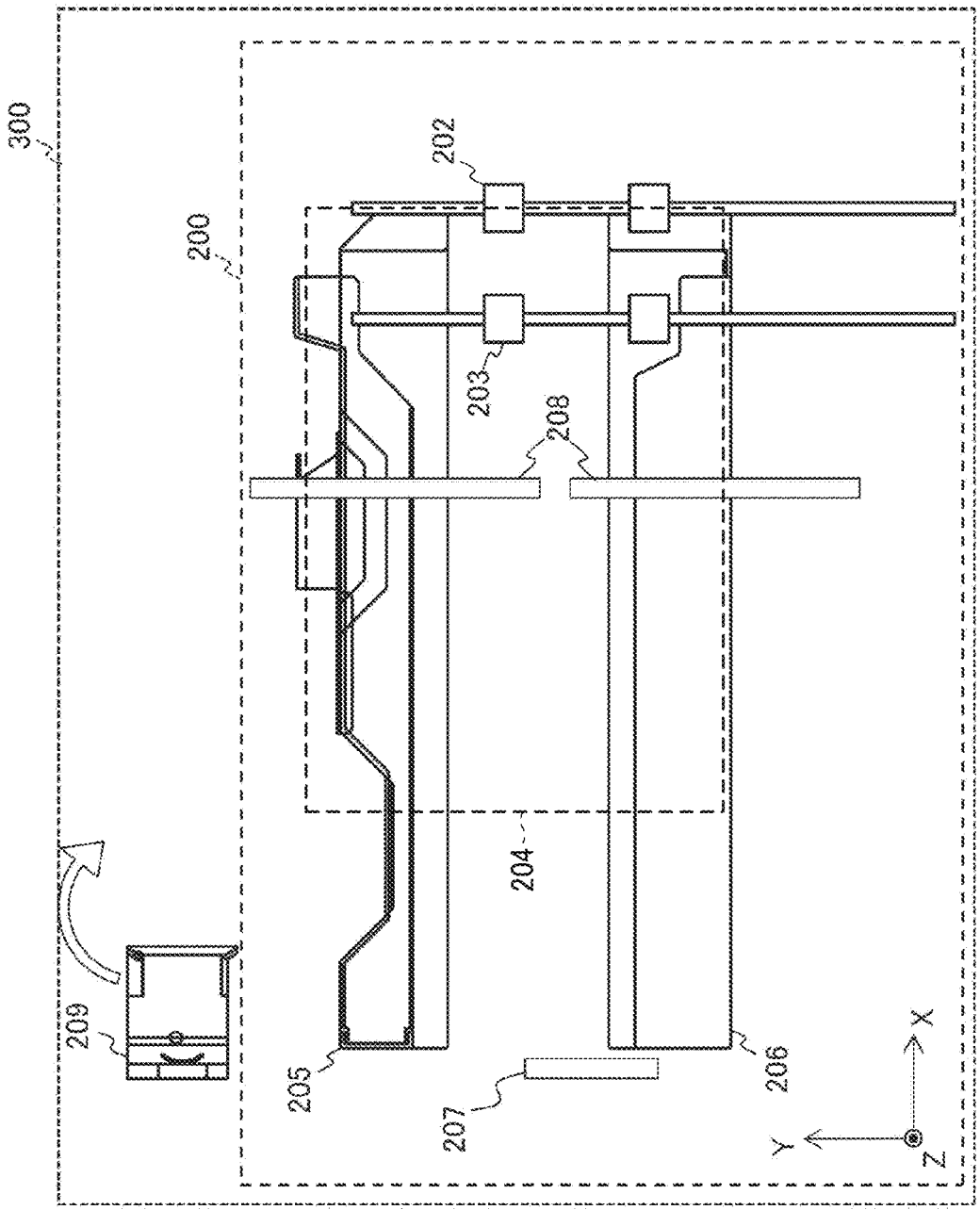
FIGS. 5A and 5B are top views of the sheet alignment apparatus and the post-processing apparatus in the stapling mode operation according to the first embodiment of the present disclosure.
Figure 5B:
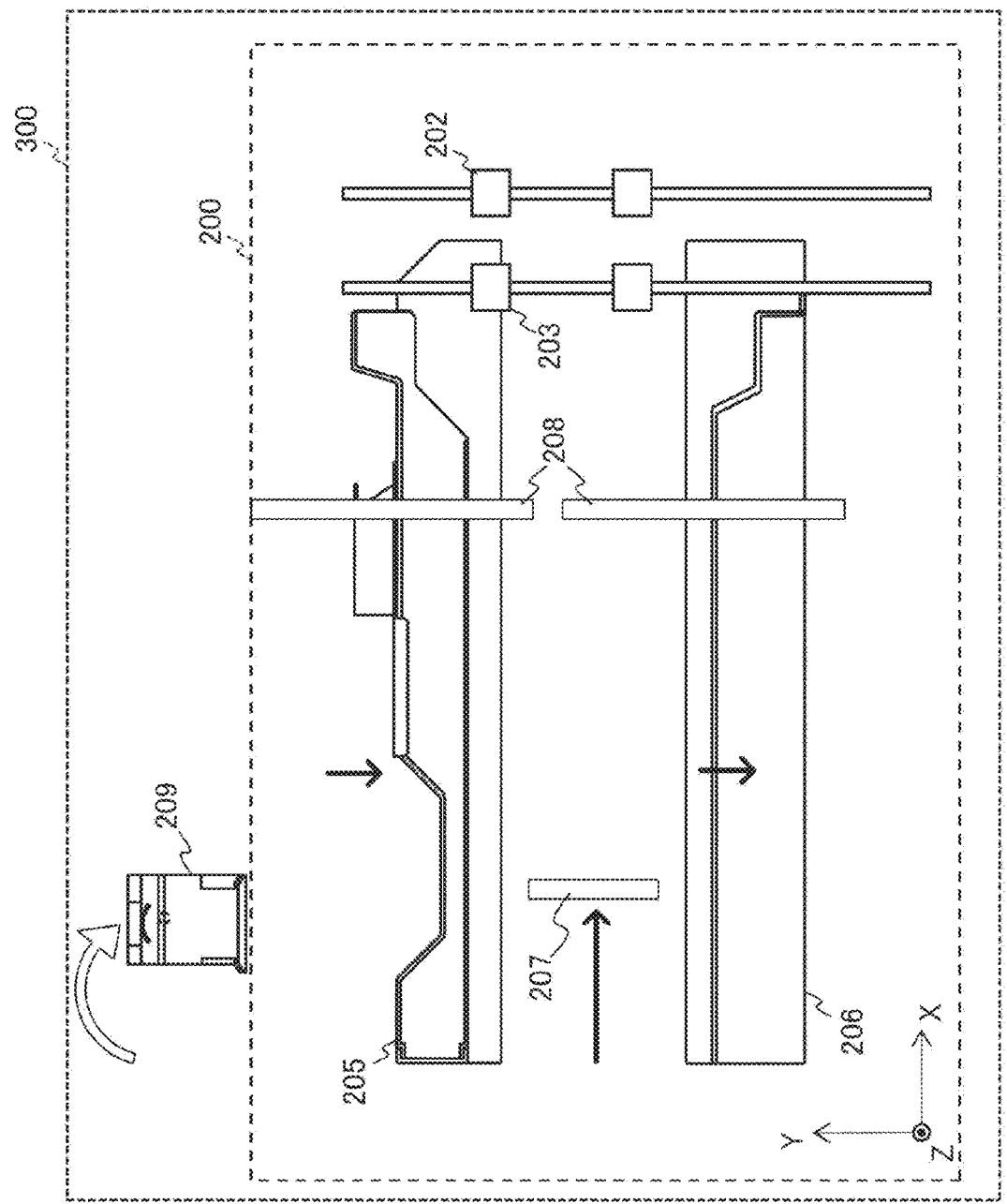

FIG. 4 is a side view and FIGS. 5A, 5B, 6A, and 6B are top views illustrating operations of the sheet alignment apparatus 200 in the stapling mode. In the stapling mode, as illustrated in FIGS. 5A and 5B, the ejection tray 204, the jogger fences 205 and 206, and the leading end stopper 207 are moved from predetermined home positions to the corresponding sheet receiving positions in accordance with the size of the sheet to be ejected to an upper surface of the ejection tray 204 or a surface of the uppermost sheet on the ejection tray 204. Note that the above-described home positions are illustrated in FIG. 5A and the sheet receiving positions are illustrated in FIG. 5B.

When the sheet is received, the jogger fences 205 and 206 receive the sheet at positions where a gap of about "X" mm can be formed with respect to the size of the ejected sheet in the width direction. In the present embodiment, "X" is a value larger than 0 mm and is a width capable of receiving a skewed sheet.

When a sheet surface detection sensor provided in the sheet surface detection feeler 211 detects that the ejection tray 204 has moved from the position indicated by the broken line to the specified position indicated by the solid line in FIG. 4, the sheet surface detection feeler 211 rotates about its axis and takes a posture in which the tip of the sheet surface detection feeler 211 is retracted in the rear end reference fence 213. The retracted position of the sheet surface detection feeler 211 is indicated by the broken line in FIG. 4.

Further, at the same time when the ejection tray 204, the jogger fences 205 and 206, and the leading end stopper 207 move, the stapler 209 is moved to a predetermined stapling position (binding position), which is illustrated in FIG. 5B, by a stapler movement motor.

After the jogger fences 205 and 206 have moved, the sheet is ejected from the sheet ejection roller pair 203 to the jogger fences 205 and 206. At the timing when the rear end of the sheet comes out of the sheet ejection roller pair 203, the tip of the rear end guide 212 rotates around the shaft of the rear end guide 212 to descend toward the jogger fences 205 and 206 and moves from the position indicated by the broken line to the position indicated by the solid line in FIG. 4. The above-described operation of the rear end guide 212 allows the rear end of the sheet to be pressed from above, and can prevent the rear end of an upper sheet among the sheets stacked on the jogger fences 205 and 206 from moving when the leading end stopper 207 pushes the leading end of the sheets in the rear end direction.

Figure 6A:
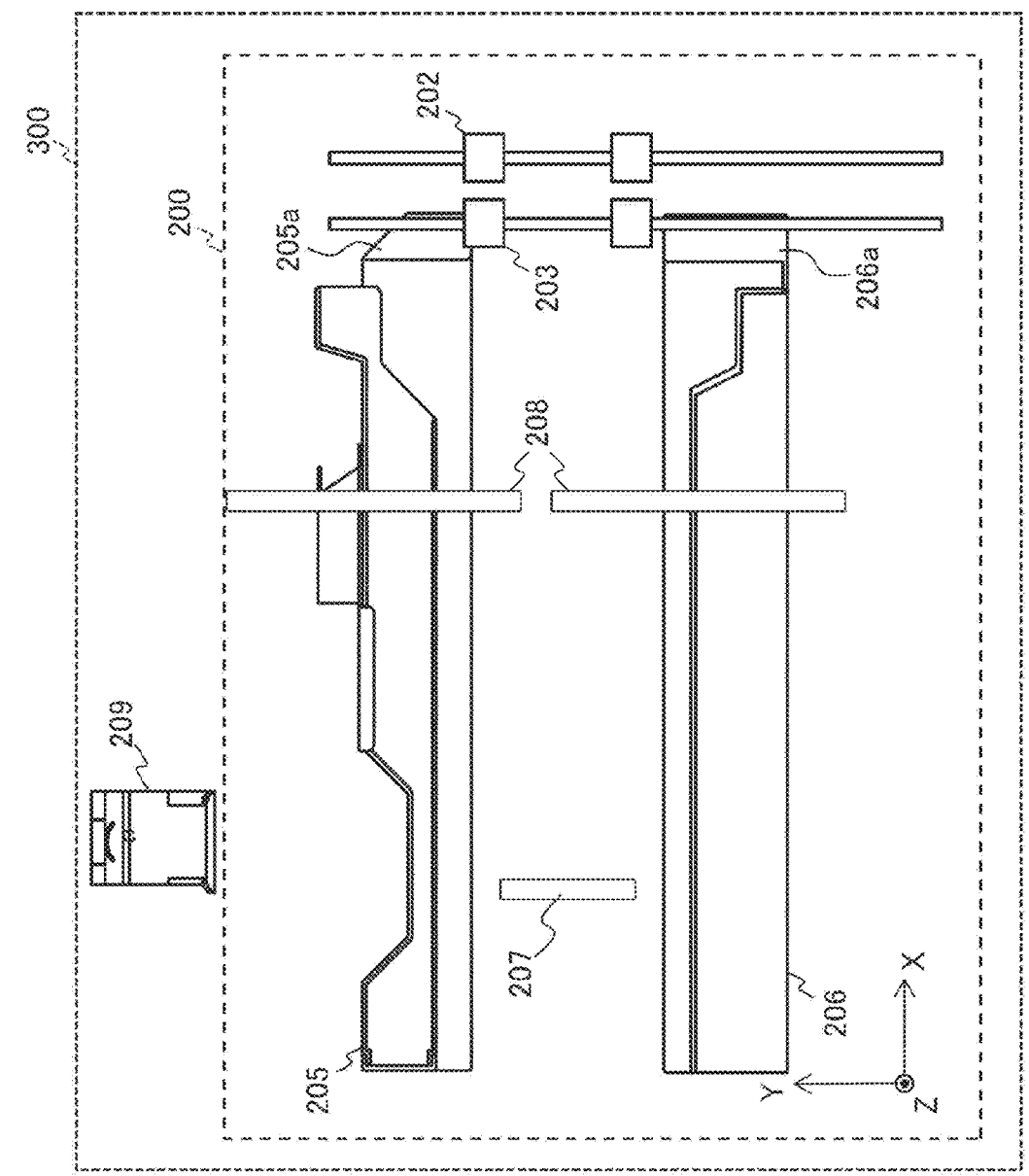
FIGS. 6A and 6B are schematic top views of the sheet alignment apparatus and the post-processing apparatus in the stapling mode operation according to the first embodiment of the present disclosure.
Figure 6B:
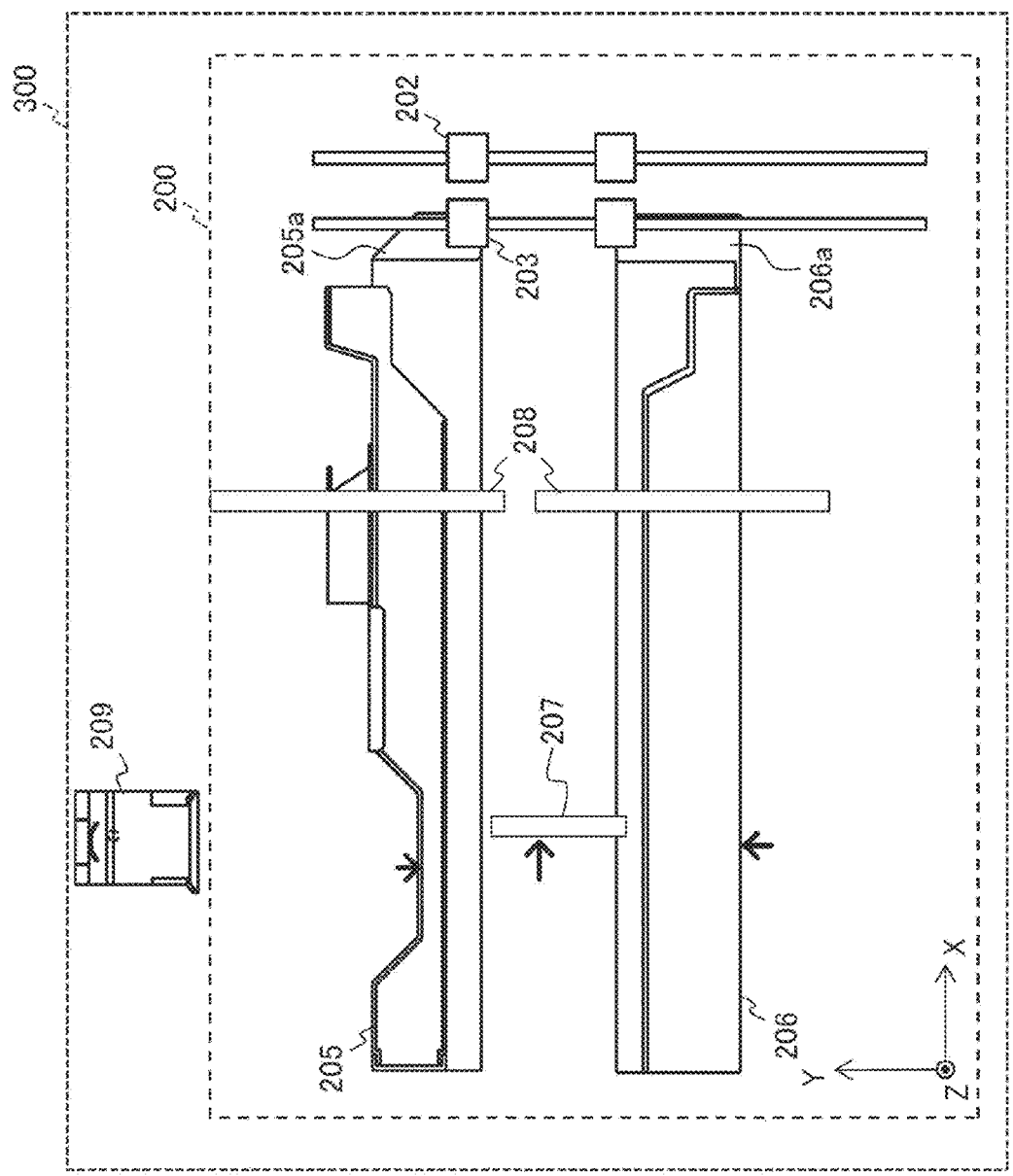

After the rear end guide 212 is lowered, the leading end stopper 207 is moved from the sheet receiving position to an upstream side in the sheet conveyance direction from a state illustrated in FIG. 6A to a state illustrated in FIG. 6B, and the sheet is sandwiched by the leading end stopper 207, a sheet rear end receiver 205a of the jogger fence 205, and a sheet rear end receiver 206a of the jogger fence 206. In the above-described state, the sheet is aligned in the sheet conveyance direction (X-axis direction). That is, the above-described operation allows the leading ends of the sheets stacked on the jogger fences 205 and 206 to be aligned (alignment of ends in the sheet conveyance direction).

At the same time, the jogger fences 205 and 206 move toward each other (inward) to sandwich the sheets in the width direction. The sheets being sandwiched as described above allows the side ends of the sheets to be aligned (see FIG. 6B). After the alignment of the side ends of the sheet (position alignment of side ends) in the width direction and the sheet conveyance direction is completed, the jogger fences 205 and 206, the leading end stopper 207, and the rear end guide 212 move to the corresponding sheet receiving positions again (see FIG. 6A).

The above-described sheet alignment operation is repeated from the first sheet to the last sheet. When the alignment operation of the last sheet is completed, the jogger fences 205 and 206 move the side ends of the sheet bundle PB to "stapling positions (binding positions)" as predetermined positions at which the stapler 209 performs the binding processing while relatively holding the sandwiched position of the sheets in the width direction.

Figure 7:
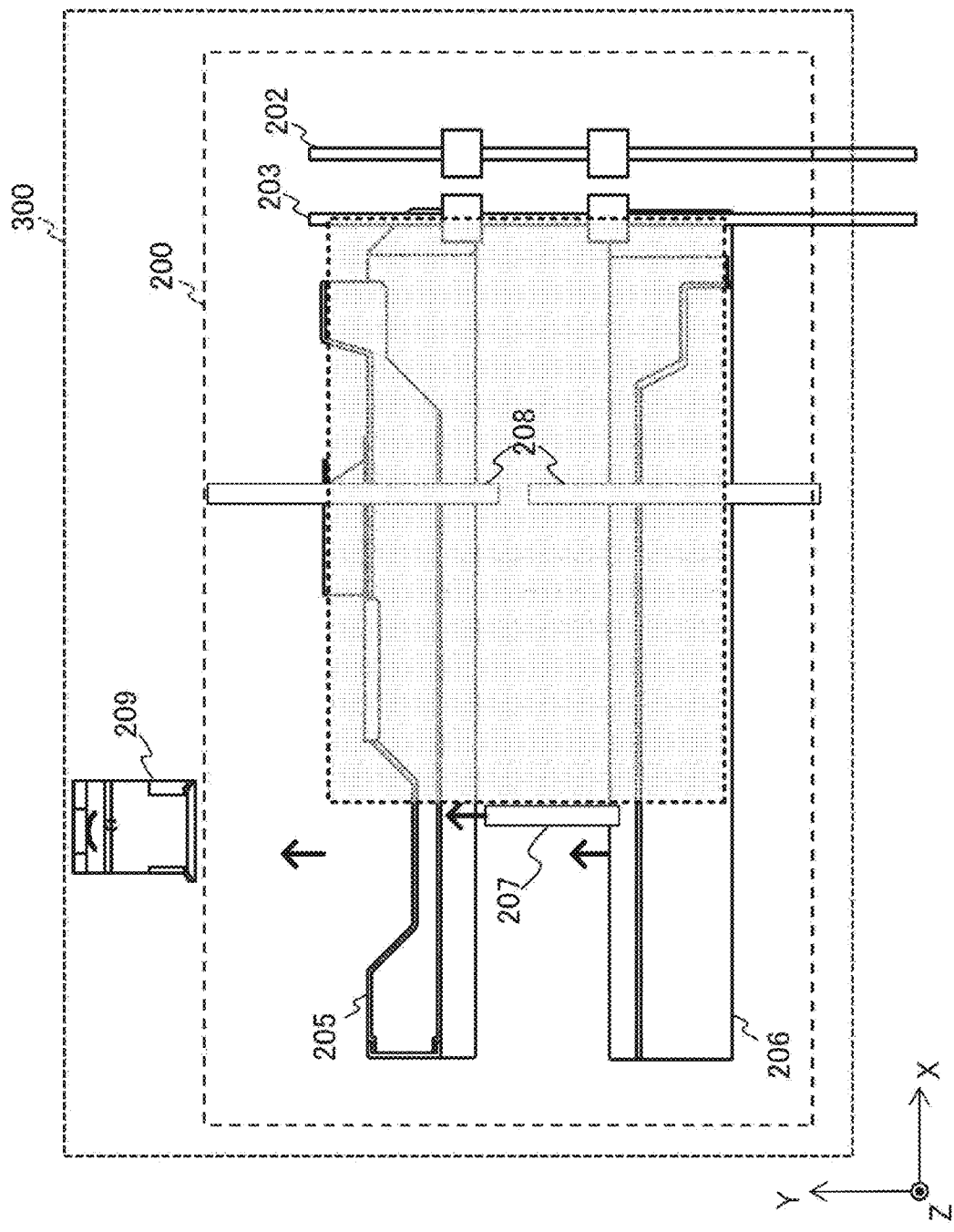
FIG. 7 is a schematic top view of the sheet alignment apparatus and a post-processing apparatus when the sheet alignment apparatus moves to the stapling position according to the first embodiment of the present disclosure.

When the jogger fences 205 and 206 move, the leading end stopper 207 operates so as not to hinder the movement of the jogger fences 205 and 206 to the stapling position while holding the leading end of the sheet bundle PB at a position at which the leading end of the sheet bundle PB can be aligned as illustrated in FIG. 7.

When the jogger fences 205 and 206 move to the stapling positions, the binding processing is performed on the sheet bundle PB. After the binding processing by the stapler 209 is completed, the jogger fences 205 and 206 return to the positions at which the sheets are aligned in the width direction. At this time, the leading end stopper 207 also returns to the alignment position in the sheet conveyance direction. That is, the sheet bundle PB moves to the binding position in a state in which the leading ends of the sheets are aligned once, and then returns to the position at which the alignment of the sheet bundle PB in the width direction is performed. Moving the jogger fences 205 and 206 in directions away from each other allows surfaces of the jogger fences 205 and 206 with which the stacked sheets are held by the jogger fences 205 and 206 to be positioned outside the side ends of the sheet bundle PB in the width direction. Accordingly, the sheet bundle PB is dropped onto the ejection tray 204 positioned below. After the sheet bundle PB is dropped, the jogger fences 205 and 206 and the leading end stopper 207 are moved to the sheet receiving positions.

After the sheet bundle PB is dropped, the sheet surface detection feeler 211 of the sheet bundle PB is projected (moved) from the retracted position to the detection position at which the sheet stacking height of sheet bundle PB is detected, and the ejection tray 204 is lowered by the thickness of the stacked sheets of the sheet bundle PB. As a result, the distance from the bottom surface of each of the jogger fences 205 and 206 to the uppermost sheet on the ejection tray 204 is kept constant. Thus, a large number of sheets can be stacked. Note that the jogger fences 205 and 206 may be moved to the sheet receiving positions after or before the lowering operation of the ejection tray 204 is completed.

When all print jobs are completed, the ejection tray 204 is lowered to the lowermost position (initial position), and the jogger fences 205 and 206, the leading end stopper 207, and the stapler 209 are also moved to the corresponding home positions.

Figure 8B:
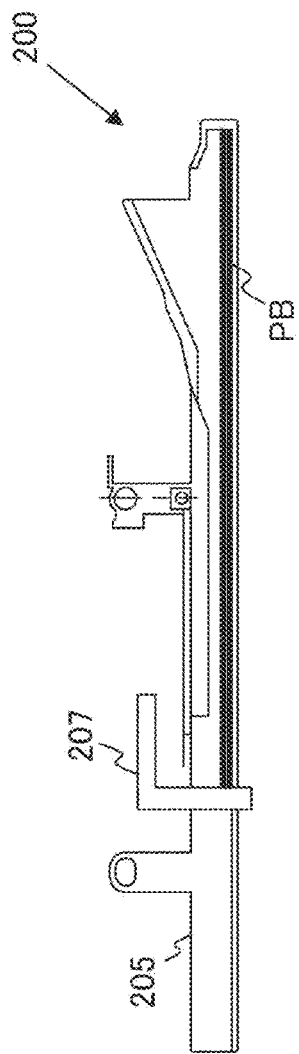

FIG. 8A is a top view of the sheet alignment apparatus 200 including the leading end stopper 207 according to the present embodiment. FIG. 8B is a cross-sectional view of the sheet alignment apparatus 200 including the leading end stopper 207 taken along line B-B of FIG. 8A. The leading end stopper 207 according to the present embodiment is formed so as to regulate the position of the leading end of the sheet bundle PB in the sheet conveyance direction and align the leading end of the sheet bundle PB.

In the present embodiment, each of the operation positions of the leading end stopper 207 is described. The position in the standby state (standby position) in which the sheet is received is a position at which a gap of about "X" millimeters can be formed with respect to the position of the leading end of the ejected sheet, that is, a position corresponding to a length obtained by adding "X" millimeters to the length (sheet length) of the sheet in the sheet conveyance direction. In the present embodiment, "X" is a value larger than 0 mm.

The position (alignment position) at which the leading end stopper 207 aligns the leading end of the sheet is a position corresponding to the length of the sheet (sheet length) in the sheet conveyance direction. The position at which the leading end stopper 207 moves to the stapling position while aligning the leading end of the sheet is a position corresponding to a length (sheet length) of the sheet in the sheet conveyance direction. The position (sheet bundle ejection position) at which the sheet bundle PB after the binding processing is ejected to the ejection tray 204 is a position corresponding to the length (sheet length) of the sheet in the sheet conveyance direction. That is, the leading end stopper 207 stays at a position at which the leading end of the sheet bundle PB is kept aligned after the leading end of the sheet bundle PB is aligned and until the sheet bundle PB is ejected after the binding of the sheet bundle PB is performed.

Note that, as illustrated in FIG. 24, the stapler 209 is movable in the sheet conveyance direction. The jogger fences 205 and 206 perform the binding processing at predetermined positions in accordance with the "sheet size" that defines the size of the sheet in the width direction and in the sheet conveyance direction. Accordingly, the jogger fences 205 and 206 also change the amount of movement when aligning the side ends of the sheets in accordance with the sheet size (sheet width).

The amount of movement (moving distance) of the jogger fences 205 and 206 from the state in which the side ends of the sheets are aligned to the stapling positions varies depending on the sheet size. Therefore, the controller 260 controls the jogger fences 205 and 206 to move by different amounts (distances) depending on the sheet size as required.

For example, when the sheet size is regular "A3 size", the width dimension is "297 mm" and when the sheet size is "B5 size", the width dimension is "182 mm". Comparing these two sheet sizes, the difference in the width dimensions is 115 mm. Therefore, when the sheet bundle PB of the B5-size sheets is moved to the stapling position, the controller 260 performs control such that the sheet bundle PB of the B5-size sheets is moved by 57.5 mm more than when the sheet bundle PB of the A3-size sheets is moved.

FIGS. 9A and 9B are enlarged perspective views of the leading end stopper 207 and the periphery of the leading end stopper 207. As illustrated in FIG. 9A, the leading end stopper 207 is rotated in a direction indicated by arrow D by the jogger fence 206 when the leading ends of the sheets are aligned and the jogger fences 205 and 206 are moved to the binding positions. The leading end stopper 207 includes a contact portion 2071, a leading end stopper holding shaft 2072, a timing belt 2073, a magnet 2074, and a leading end stopper regulating shaft 2075. The contact portion 2071 slides while contacting the leading end of the sheet bundle PB during rotation. The leading end stopper holding shaft 2072 as a shaft rotates the contact portion 2071 and moves the contact portion 2071 in the sheet conveyance direction. The timing belt 2073 moves the contact portion 2071 along the leading end stopper holding shaft 2072 in the sheet conveyance direction. The magnet 2074 generates magnetic force to hold the contact portion 2071 such that the contact portion 2071 stays at a position at which the contact portion 2071 aligns the leading end of the sheet when a sheet is received. The leading end stopper regulating shaft 2075 regulates the contact portion 2071 to stay at a predetermined position by the magnetic force of the magnet 2074.

The timing belt 2073 is operated by a leading end stopper moving motor and a pulley.

As illustrated in FIG. 9 B, the leading end stopper 207 may include a return spring 2076 as an elastic member disposed so as to connect the contact portion 2071 and the leading end stopper regulating shaft 2075 as a regulating shaft. The return spring 2076 is an elastic member that biases the contact portion 2071 in a direction of returning the contact portion 2071 to the alignment position of the leading end of the sheet bundle PB when the jogger fences 205 and 206 return to the sheet receiving positions after the contact portion 2071 rotates in the direction indicated by arrow D.

When the contact portion 2071 rotates in the direction indicated by arrow D, the surface of the contact portion 2071 facing the leading end of the sheet bundle PB, that is, a contact surface of the contact portion 2071 moves so as to draw an arc with respect to the vertical direction while sliding with respect to the leading end of the sheet bundle PB. During the above-described movement of the contact portion 2071, the contact surface of the contact portion 2071 is in contact with the aligned leading end of the sheet bundle PB.

Operation Procedure in Stapling Mode

Figures 10, 10A:
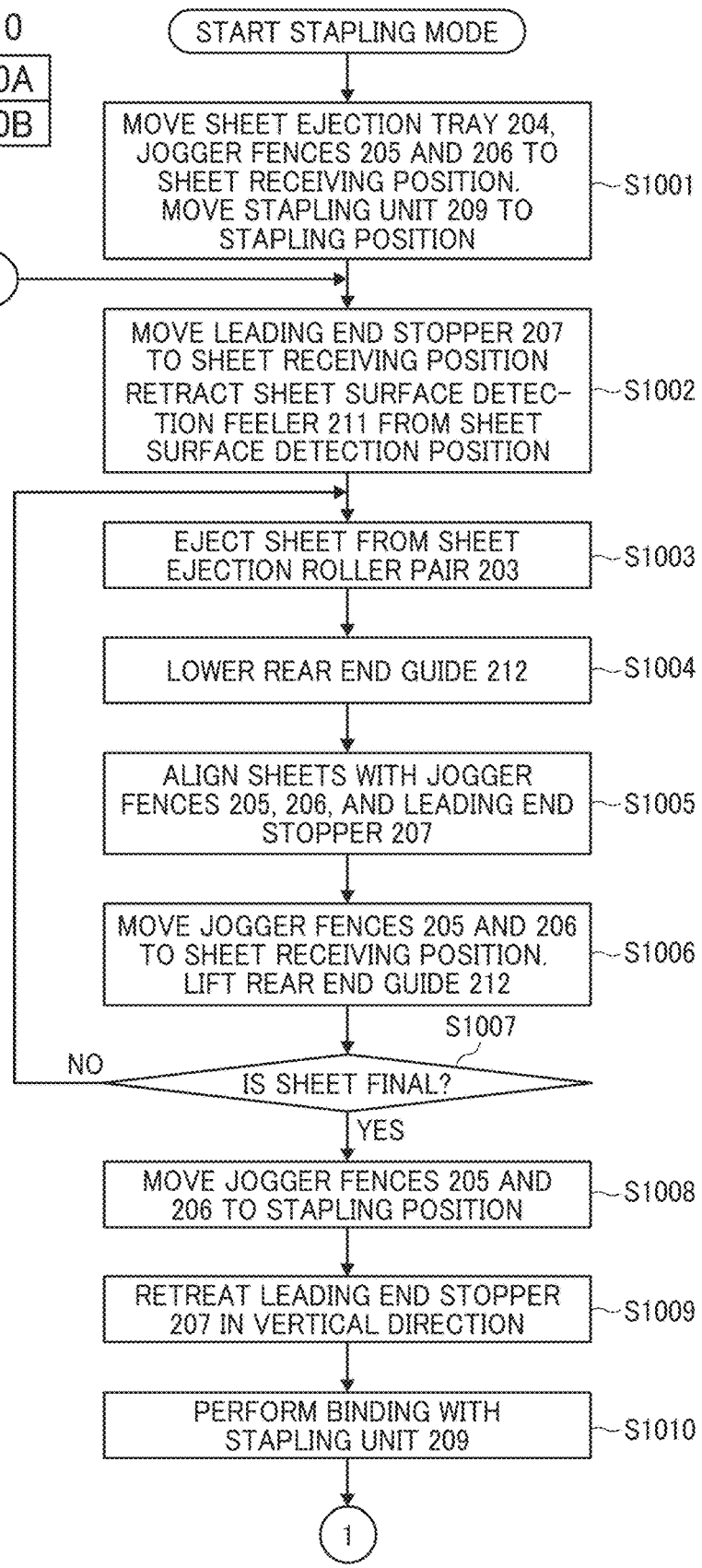
FIG. 10 including
FIGS. 10A and 10B are flowchart of the stapling mode operation according to the first embodiment of the present disclosure.
Figure 10B:
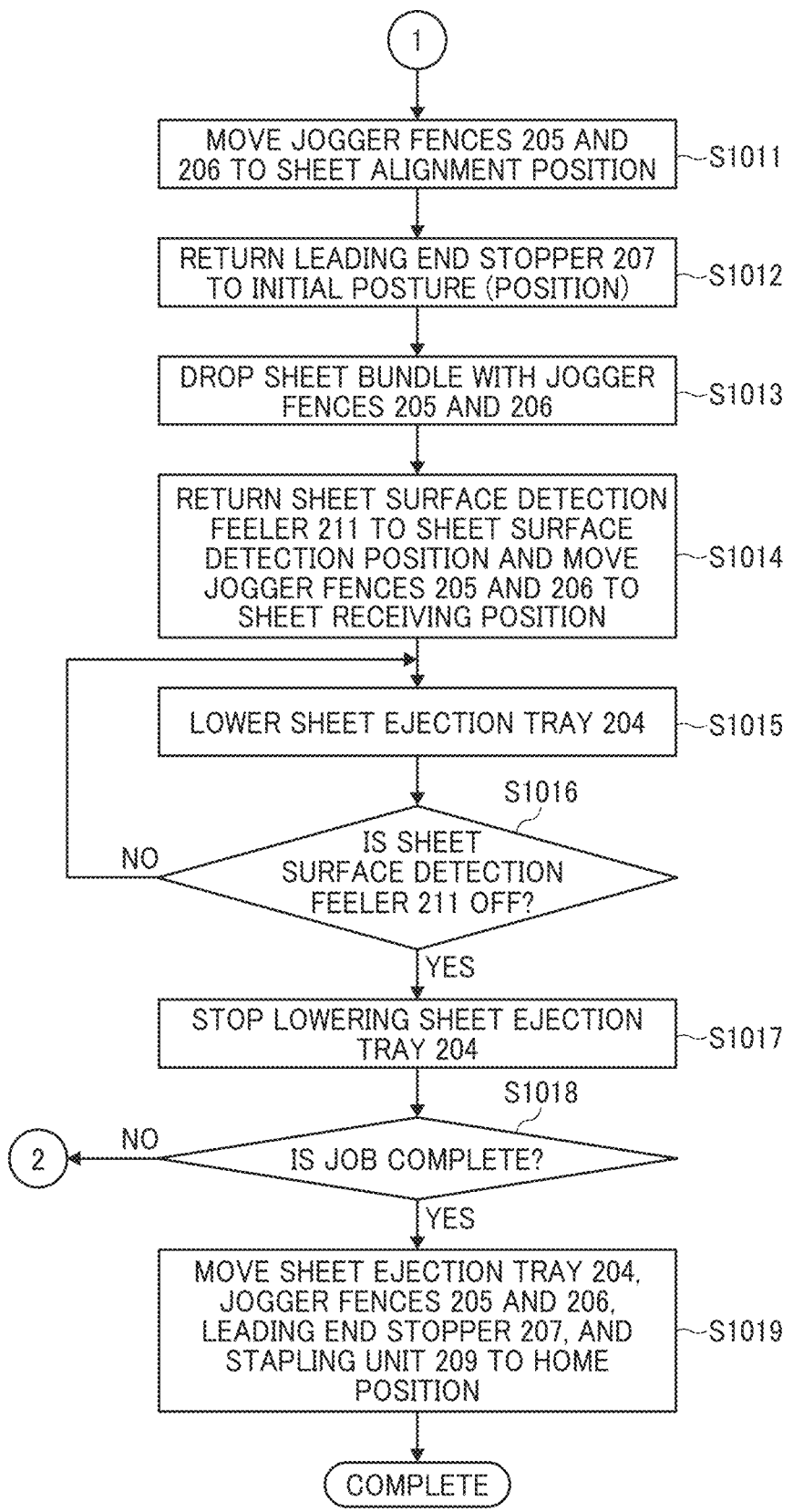

FIG. 10 is a flowchart of an operation procedure of the stapling mode described above. The operation procedure described in this flowchart is performed based on instructions (control signals) from the controller 260. Note that details of the operation have been described as above, a brief description is given below.

At the start of the operation in the stapling mode, the ejection tray 204 and the jogger fences 205 and 206 are moved from the respective home positions to the respective sheet receiving positions, and the stapler 209 is moved from the home position to the predetermined stapling position (S1001). The leading end stopper 207 is moved from the corresponding home position to the corresponding sheet receiving position, and the sheet surface detection feeler 211 is retracted from the detection position (S1002).

When a sheet is ejected from the sheet ejection roller pair 203 (S1003), the rear end guide 212 is lowered to press the sheet from above (S1004), and the jogger fences 205 and 206 and the leading end stopper 207 align the sheet (S1005). After the sheet is aligned, the jogger fences 205 and 206 and the leading end stopper 207 are moved to the respective sheet receiving positions, and the rear end guide 212 is lifted (S1006).

The controller 260 determines whether the sheet is the last sheet (S1007). If the sheet is not the last sheet (NO in S1007), the process returns to S1003 and steps from S1003 to S1007 are repeated until the sheet is determined to the last sheet. If the sheet is the last sheet (YES in S1007), the jogger fences 205 and 206 are moved to the stapling positions (S1008). During the above-described movement of the S1008, the leading end stopper 207 retracts vertically as described below (S1009).

After the jogger fences 205 and 206 are moved to the stapling positions, the stapler 209 performs the binding processing on the sheet bundle PB moved to the binding position (S1010).

After the binding processing, the jogger fences 205 and 206 are moved to the sheet ejection positions (S1011). The movement of the jogger fences 205 and 206 causes the leading end stopper 207 to return to the initial posture of the leading end stopper 207 (S1012). Then, the jogger fences 205 and 206 are moved away from each other to drop the sheet bundle PB (S1013).

After the sheet bundle PB falls onto the ejection tray 204, the sheet surface detection feeler 211 is returned (moved) to the detection position, the jogger fences 205 and 206 are moved to the sheet receiving positions (S1014), and the ejection tray 204 is lowered (S1015). This lowering of the ejection tray 204 is performed until the sheet surface detection sensor is turned off (loop of NO in S1016). When the sheet surface detection sensor is turned off (YES in S1016), the lowering of the ejection tray 204 is stopped (S1017).

Thereafter, the controller 260 determines whether the job is completed (S1018). When the job is not completed (NO in S1018), the process returns to S1002. When the job is completed (YES in S1018), the ejection tray 204, the jogger fences 205 and 206, the leading end stopper 207, and the stapler 209 are moved to the respective home positions (S1019), and the process described in the flowchart of FIG. 10 ends. Note that the jogger fences 205 and 206 may be moved to the sheet receiving position immediately before S1018, instead of being moved in S1014.

If the leading end stopper 207 stays at a position at which the leading end of the sheet bundle PB is aligned when the jogger fences 205 and 206 move to the stapling positions, the movement of the jogger fence 206 would be obstructed. Therefore, when the jogger fences 205 and 206 move to the stapling positions, the leading end stopper 207 moves to a position away from the sheet bundle PB. At this time, no regulating member is in contact with the leading end of the sheet bundle PB. Thus, moving of the sheet bundle PB to the stapling position while being supported by the jogger fences 205 and 206 may cause the leading end of the sheet bundle PB to be misaligned.

When the jogger fence 206 is moved to the stapling position, the leading end stopper 207 according to the present embodiment can keep the alignment of the leading end of the sheet bundle PB while retracting so as not to hinder the movement of the jogger fence 206. Such a configuration can enhance accuracy of the sheet alignment.

The operation of the leading end stopper 207 in the above-described S1008, S1009, S101, and S1012 is described with reference to FIGS. 11A, 11B, 12A, and 12B. FIGS. 11A, 11B, 12A, and 12B are schematic views of the leading end stopper 207 as viewed from a side opposite a surface against which the leading end of the sheet abuts the leading end of the sheet bundle PB toward upstream in the sheet conveyance direction.

Figure 11A:
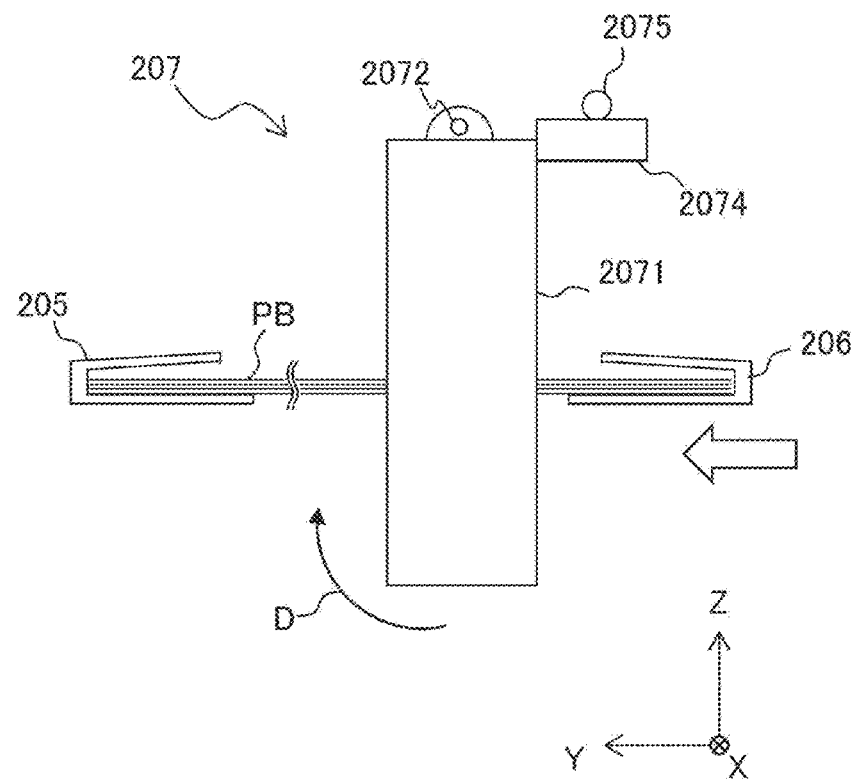
FIGS. 11A and 11B are front views of the leading end stopper illustrating an operation of the leading end stopper according to the first embodiment of the present disclosure.
Figure 11B:
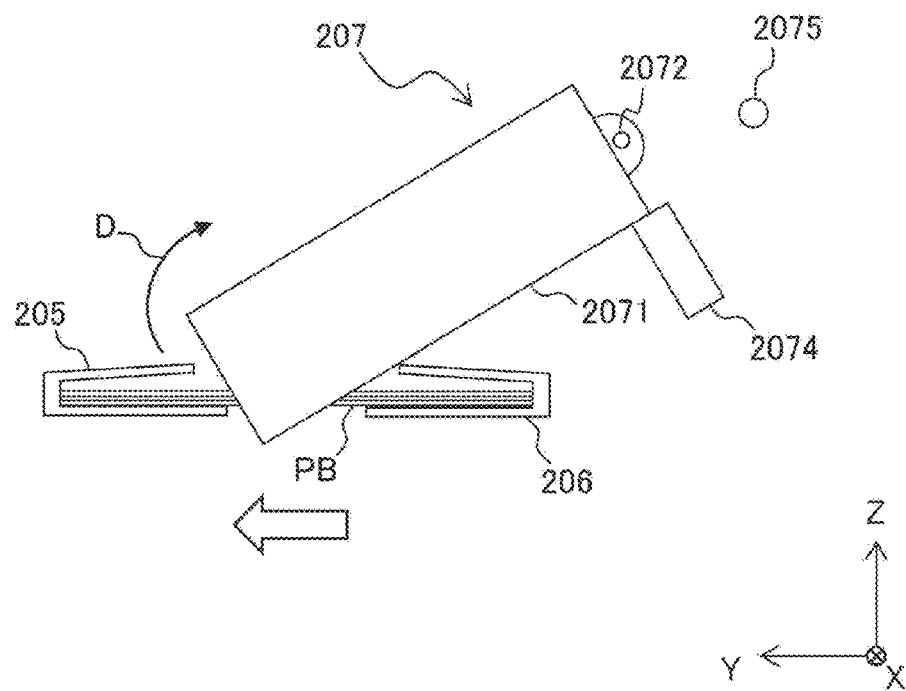

FIG. 11A illustrates a timing corresponding to the above-described S1008 in the flowchart of FIG. 10. At this time, the leading end stopper 207 is at the alignment position at which the leading end of the sheet bundle PB is aligned. The jogger fences 205 and 206 are in a state in which the jogger fences 205 and 206 start moving to the stapling position. FIG. 11B illustrates a timing corresponding to the above-described S1009 in the flowchart of FIG. 10. As illustrated in FIG. 11A, when the jogger fences 205 and 206 move to the stapling positions, the leading end stopper 207 is positioned on a movement path of the jogger fence 206. Then, the sheet bundle PB starts to move while the leading end of the sheet bundle PB is in contact with the leading end stopper 207. Accordingly, the leading end stopper 207 also starts to rotate in the direction indicated by arrow D.

Subsequently, as illustrated in FIG. 11B, the jogger fence 206 moving to the stapling position comes into contact with a side surface of the contact portion 2071 (the side surface with respect to the surface on which the leading end of the sheet bundle PB is aligned) and continues to move. Thus, the jogger fence 206 presses the side surface of the contact portion 2071 in the moving direction. At this time, the contact portion 2071 whose side surface is pressed by the jogger fence 206 is rotated in the direction indicated by arrow D about the leading end stopper holding shaft 2072 by the biasing force of the jogger fence 206.

During the rotation, the contact portion 2071 is kept in contact with the leading end of the sheet bundle PB. That is, when the sheet bundle PB is moved to the stapling position, the alignment of the leading end of the sheet bundle PB is maintained.

Figure 12A:
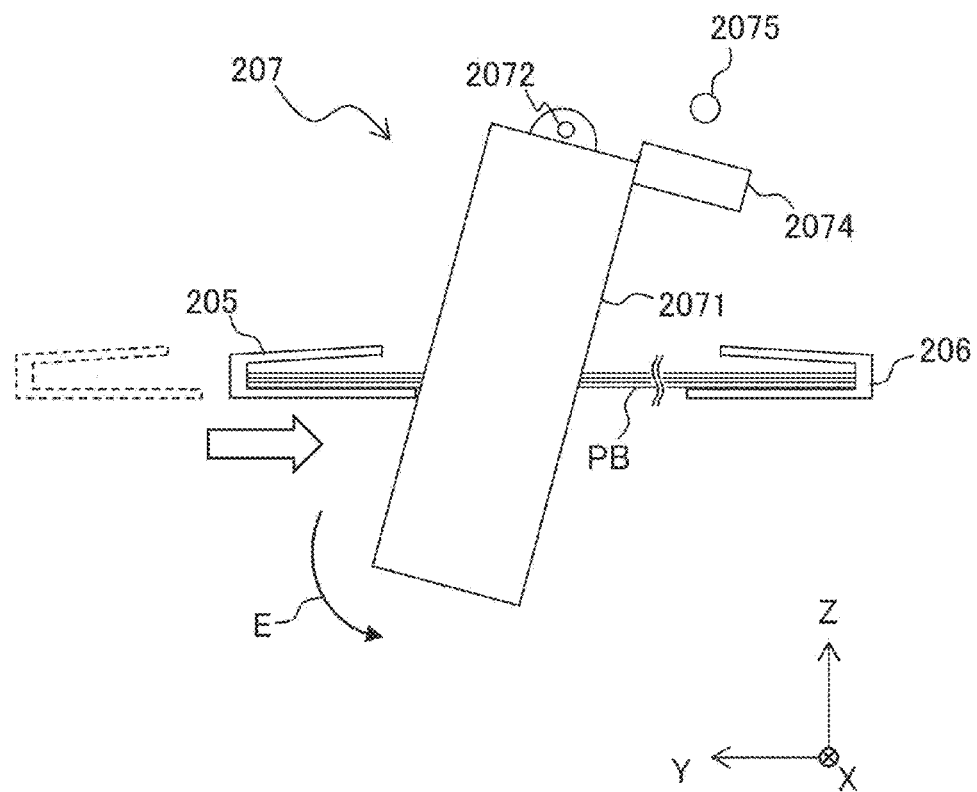
FIGS. 12A and 12B are front views of the leading end stopper illustrating an operation of the leading end stopper according to the first embodiment of the present disclosure.

FIG. 12A illustrates a timing corresponding to the above-described S1011 in the flowchart of FIG. 10. At this time, among the jogger fences 205 and 206 moving to the sheet alignment position (original position), the jogger fence 206 is separated from the side surface of the contact portion 2071 and the jogger fence 205 temporarily biases an opposite side surface of the contact portion 2071 (the opposite side surface of the side surface pressed by the jogger fence 206). Then, the leading end stopper 207 starts to rotate in a direction indicated by arrow E by its own weight.

Figure 12B:
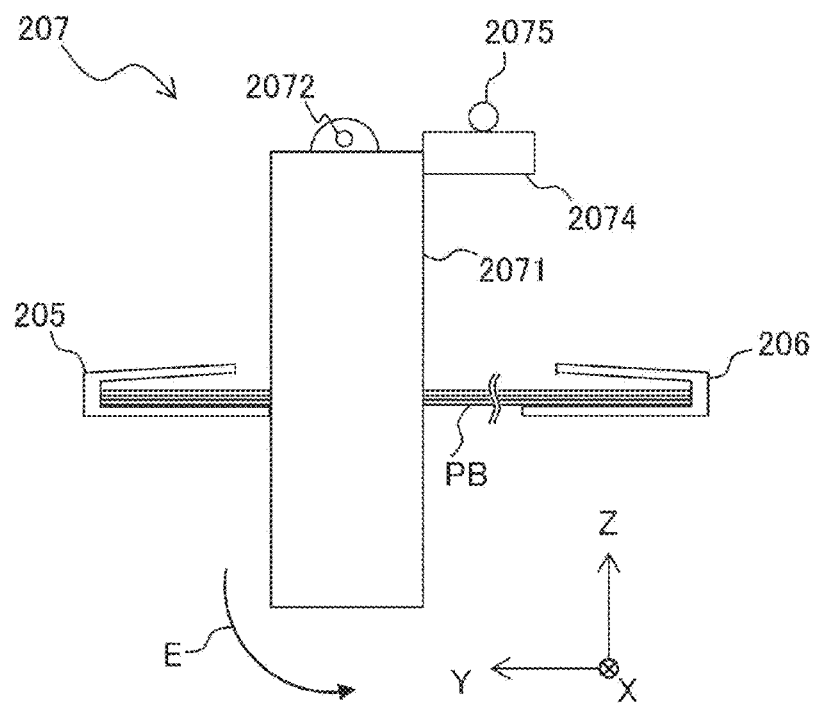

FIG. 12B illustrates a timing corresponding to the above-described S1012 in the flowchart of FIG. 10. When the jogger fences 205 and 206 return to their original positions, the contact portion 2071 rotates in the direction indicated by arrow E about the leading end stopper holding shaft 2072 due to its own weight and also returns to the original position. At this time, the magnet 2074 is attracted to the leading end stopper regulating shaft 2075. Accordingly, the rotation of the contact portion 2071 in the direction indicated by arrow E is stopped.

Note that, as illustrated in FIG. 9B, when the leading end stopper 207 includes the return spring 2076, the contact portion 2071 is rotated toward the original position of the contact portion 2071 by the biasing force of the return spring 2076 when the biasing force of the jogger fence 206 is removed, and returns to the position at which the magnet 2074 is attracted to the leading end stopper regulating shaft 2075.

Note that the contact portion 2071 of the leading end stopper 207 rotationally moves while sliding on the leading end of the sheet bundle PB and the frictional resistance of the contact portion 2071 with the sheet bundle PB is reduced. Thus, the damage of the sheet bundle PB can be reduced and the durability of the component can be enhanced.

Second Embodiment

Figure 15A:
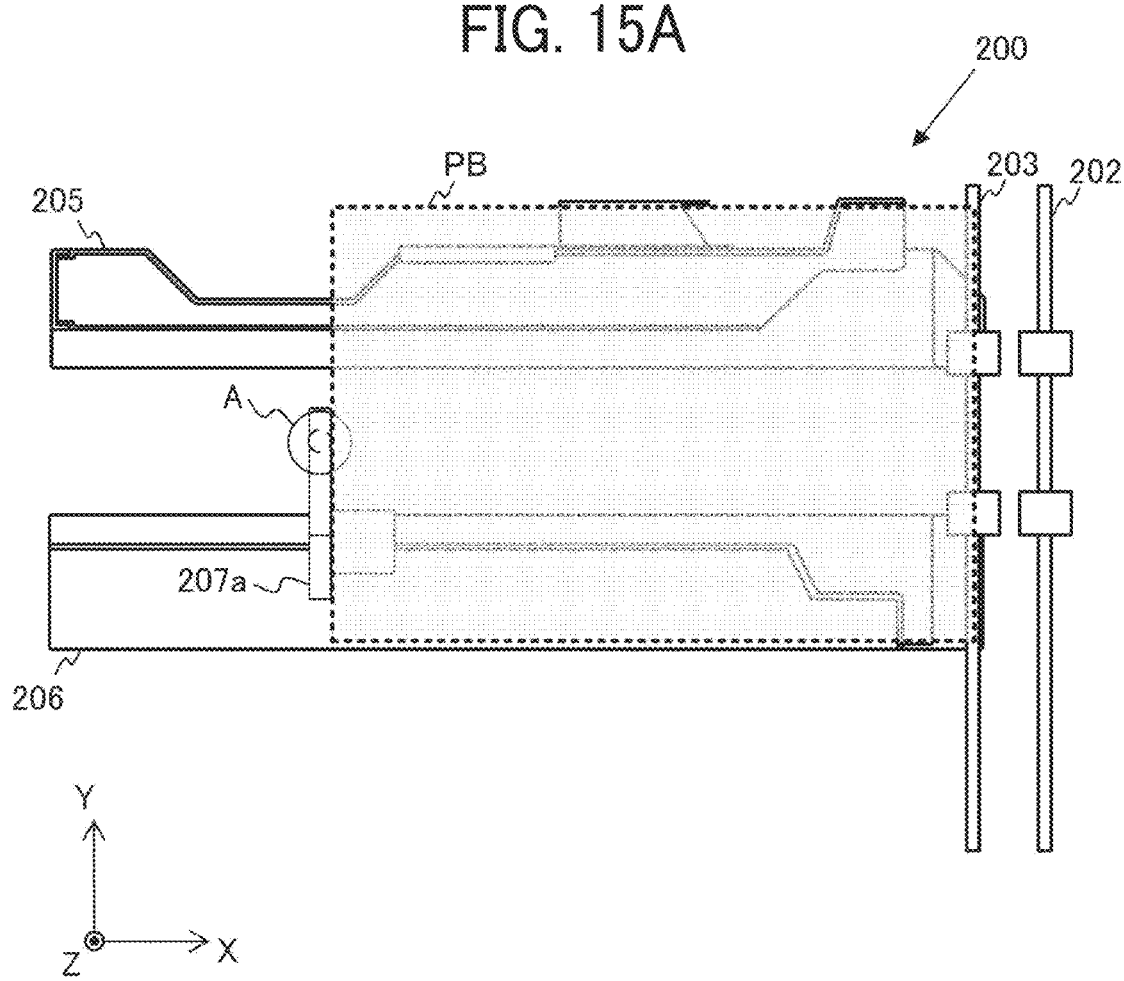
FIG. 15A is a top view of the leading end stopper according to the second embodiment of the present disclosure.
Figure 16:
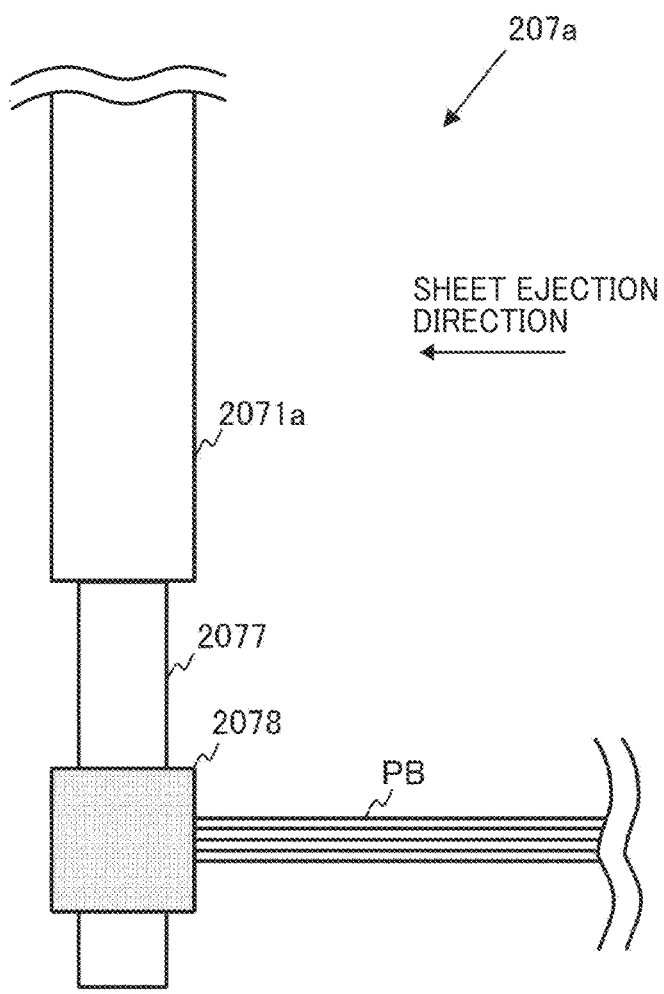
FIG. 16 is a side view of the leading end stopper according to the second embodiment of the present disclosure.

Next, a leading end stopper 207a according to a second embodiment as another embodiment of the leading end stopper 207 described in the first embodiment is described. The leading end stopper 207a is different from the leading end stopper 207 in the configuration of maintaining alignment of the leading end of the sheet bundle PB. FIGS. 13A, 13B, 14A, and 14B are schematic views of the leading end stopper 207a as viewed from a side opposite a surface of the leading end stopper 207a against which the leading end of the sheet bundle PB abuts toward upstream in the sheet conveyance direction. FIG. 15A is a top view of the sheet alignment apparatus 200 according to the present embodiment. FIG. 16 is a cross-sectional view taken along line C-C in FIG. 15A.

Figure 13A:
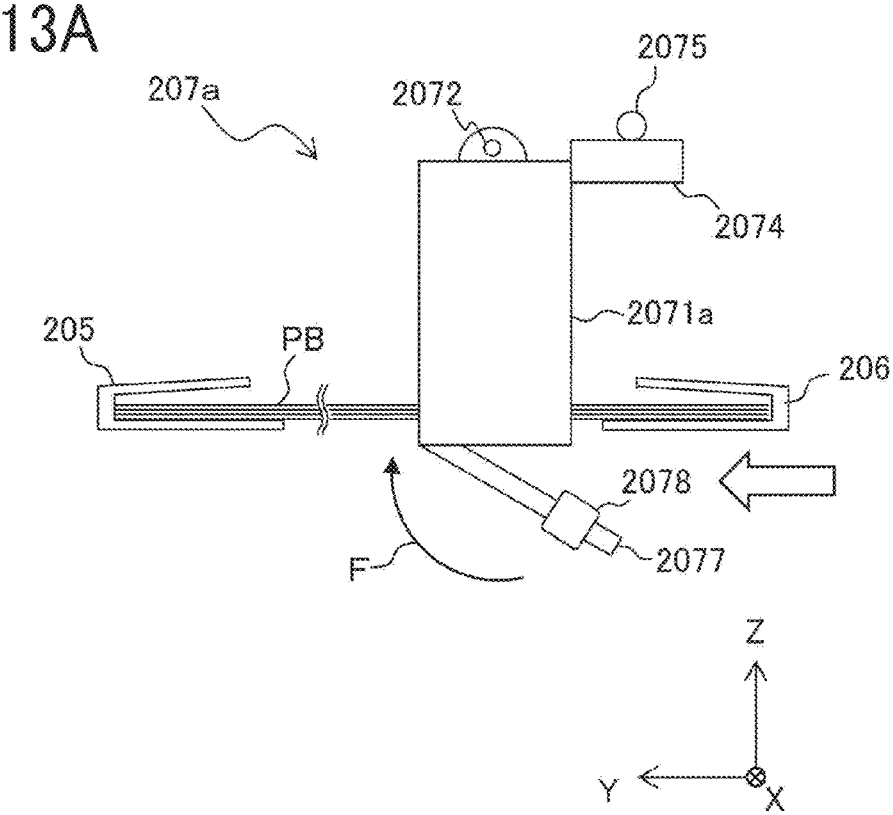
FIGS. 13A and 13B are front views of a leading end stopper illustrating an operation of the leading end stopper according to a second embodiment of the present disclosure.
Figure 13B:
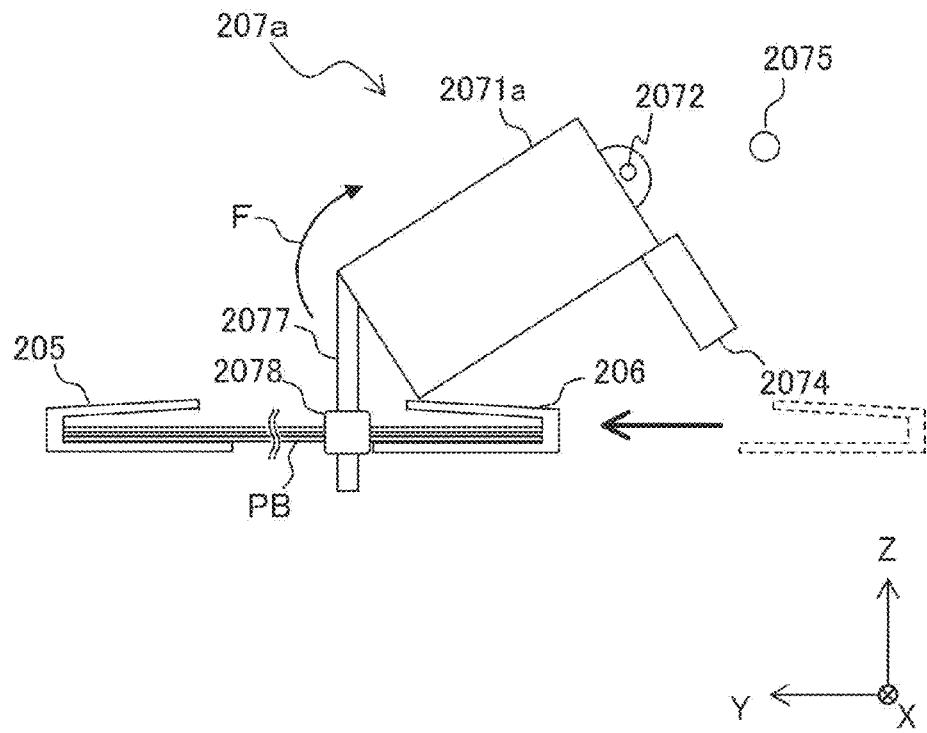

As illustrated in FIGS. 13A and 13B, unlike the leading end stopper 207 according to the first embodiment, the leading end stopper 207a according to the present embodiment includes an extended contact holder 2077 and an extended contact portion 2078 at a lower end of a contact portion 2071a. The extended contact holder 2077 is a shaft fixed to the lower end of the contact portion 2071a and is fixed in a posture inclined with respect to a bottom surface of the contact portion 2071a. The extended contact portion 2078 as a rotation contact member is a roller-shaped member fixed to the extended contact holder 2077.

FIG. 13A illustrates a state in which the sheets are stacked at the sheet receiving position to form the sheet bundle PB, the side ends of the sheet bundle PB are aligned by the jogger fences 205 and 206, and the leading end of the sheet bundle PB is aligned by the leading end stopper 207a. When the alignment of the sheet bundle PB is completed, the jogger fences 205 and 206 start moving to the stapling position. As illustrated in FIG. 13A, the sheet bundle PB starts to move while the leading end of the sheet bundle PB is in contact with the leading end stopper 207a. Accordingly, the leading end stopper 207a also starts to rotate in a direction indicated by arrow F.

Subsequently, the jogger fence 206 moving to the stapling position comes into contact with the side surface of the contact portion 2071 and continues to move. Thus, the contact portion 2071 is biased by the jogger fence 206 and the contact portion 2071 continues to rotate in the direction indicated by arrow F.

FIG. 13B illustrates a state in which the jogger fences 205 and 206 have moved to the stapling positions. At this time, a curved surface of the extended contact portion 2078 as a roller comes into contact with the leading end of the sheet bundle PB. While the state illustrated in FIG. 13A shifts to the state illustrated in FIG. 13B, that is, during the movement of the jogger fences 205 and 206 to the stapling position, the contact surface of the contact portion 2071a is separated from the leading end of the sheet bundle PB. However, the extended contact portion 2078 moves to a position at which the extended contact portion 2078 contacts the leading end of the sheet bundle PB while rotating in the direction indicated by arrow F around when the contact surface of the contact portion 2071a is separated from the leading end of the sheet bundle PB. Therefore, a state in which the alignment of the leading end of the sheet bundle PB being moved is maintained continues.

The extended contact portion 2078 is a resin roller, a metal roller, a rubber roller or the like. Therefore, even if the extended contact portion 2078 rotates and comes into contact with the leading end of the sheet bundle PB, damage to the end of the sheet bundle PB can be reduced and durability of component can be enhanced. Note that an inclination angle at which the extended contact holder 2077 is fixed to the contact portion 2071a is set to an angle at which the extended contact portion 2078 comes into contact with the leading end of the sheet bundle PB when the movement of the jogger fence 206 to the stapling position has been completed.

Figure 14A:
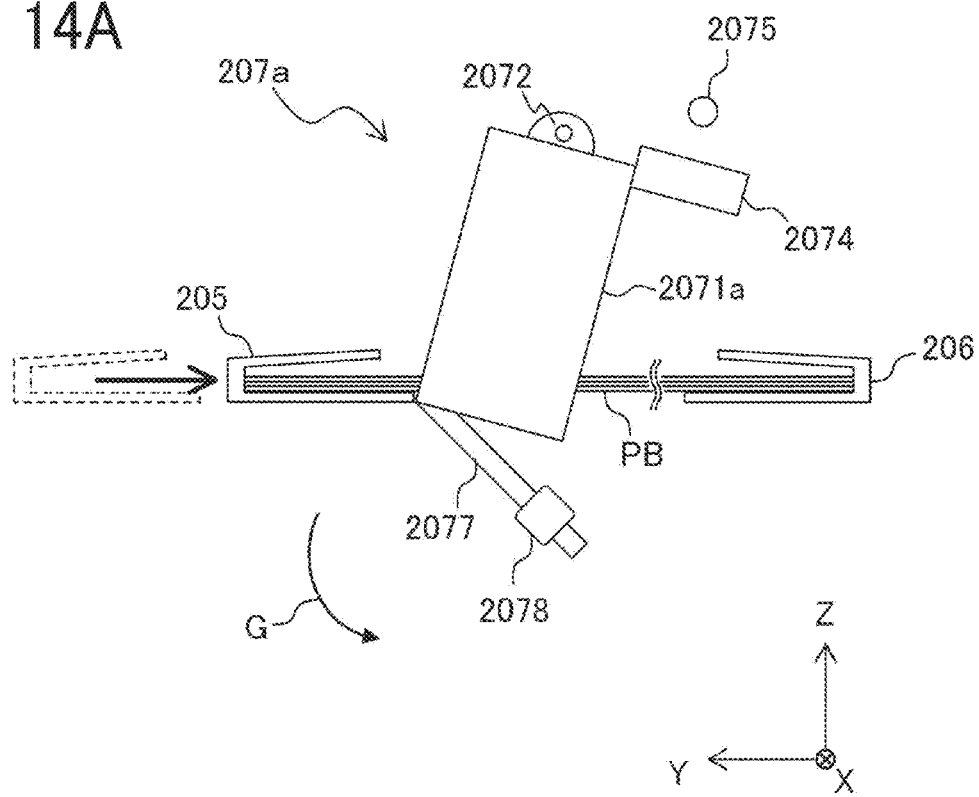
FIGS. 14A and 14B are front views of the leading end stopper illustrating an operation of the leading end stopper according to the second embodiment of the present disclosure.
Figure 14B:
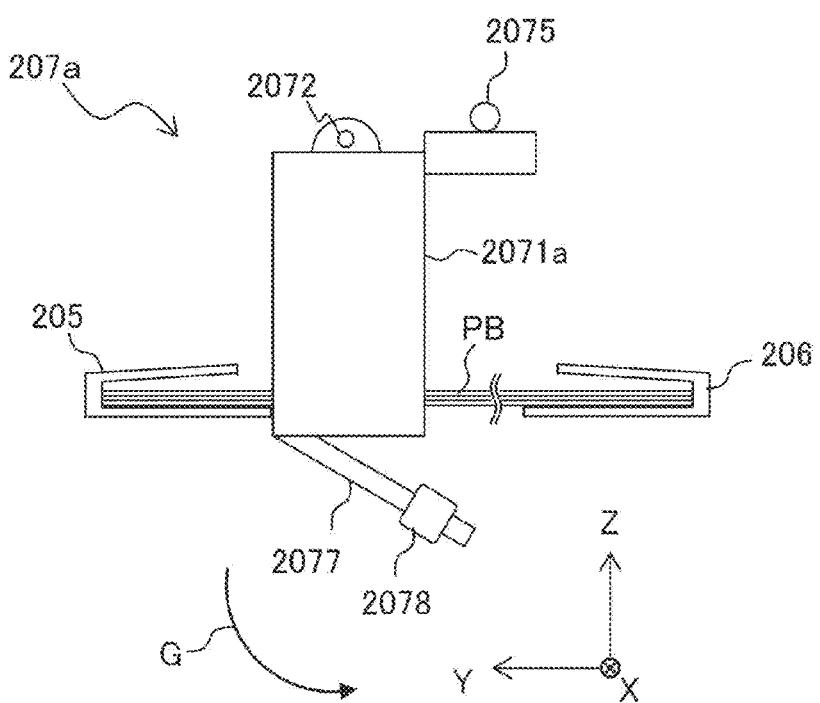

When the jogger fences 205 and 206 return from the stapling positions to the sheet receiving positions (ejection positions), the contact portion 2071a rotates in a direction indicated by arrow G as illustrated in FIG. 14A. Then, as illustrated in FIG. 14B, the leading end stopper 207a returns to the original state.

Figure 15B:
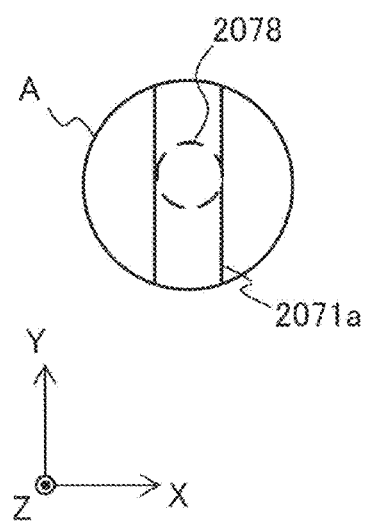
FIG. 15B is an enlarged view of an area indicated by circular A in FIG. 15A.

FIG. 15A is a top view illustrating a state in which the leading end of the sheet bundle PB and the leading end stopper 207a when the sheet bundle PB is moved to the stapling position. FIG. 16 is an enlarged side view of the leading end of the sheet bundle PB and of the leading end stopper 207a when the sheet bundle PB is moved to the stapling position. As illustrated in FIG. 15A, the leading end stopper 207a according to the present embodiment is disposed at a position at which the leading end stopper 207a contacts the leading end of the sheet bundle PB. FIG. 15B is an enlarged view of an area indicated by circular area A in FIG. 15A. As illustrated in FIGS. 15B and 16, the curved surface of the extended contact portion 2078 is positioned at the same position as a contact surface of the contact portion 2071a of the leading end stopper 207a that contacts the sheet bundle PB.

Third Embodiment

Figure 17:
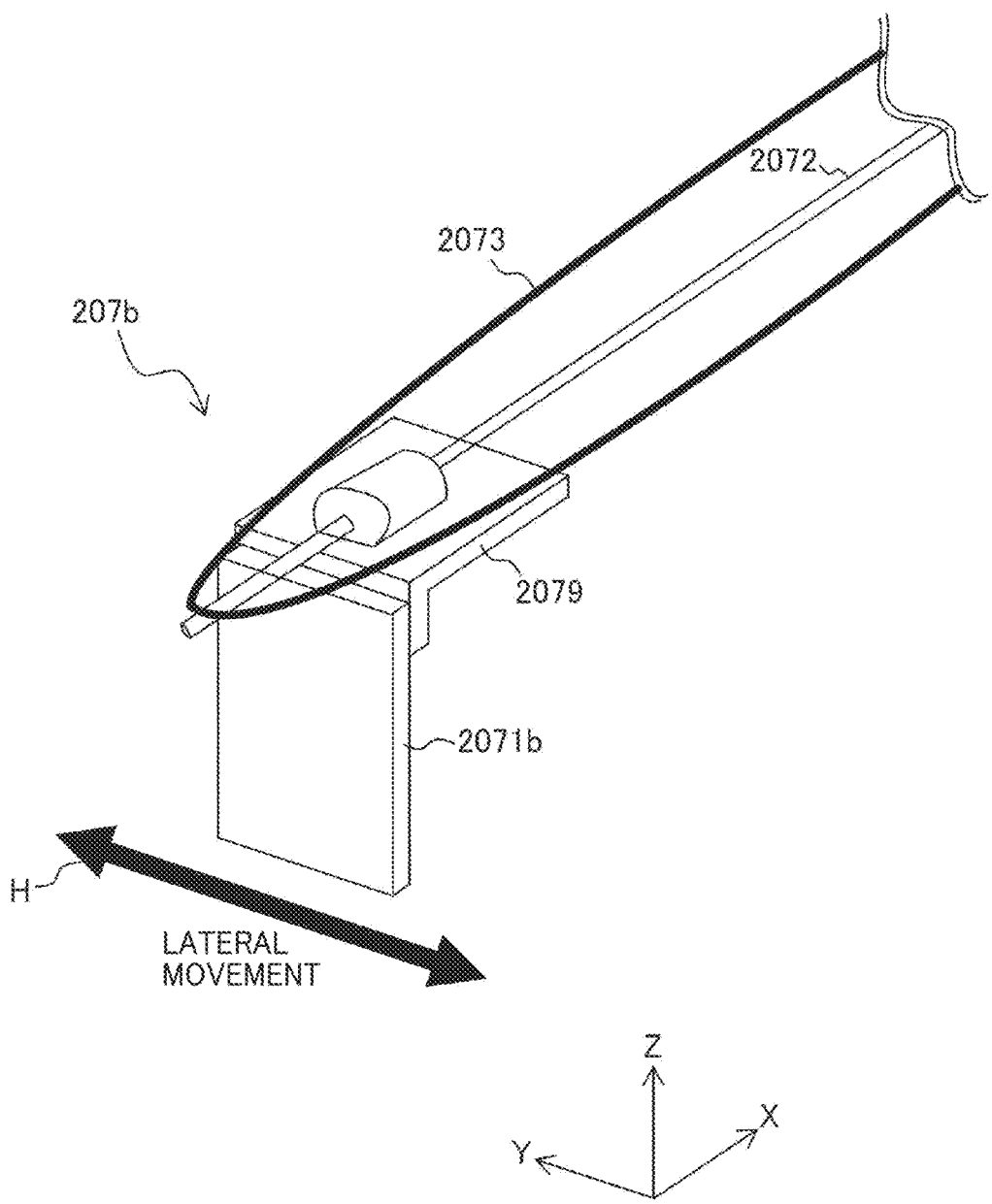
FIG. 17 is a perspective view of a configuration of a leading end stopper according to a third embodiment of the present disclosure.
Figure 18A:
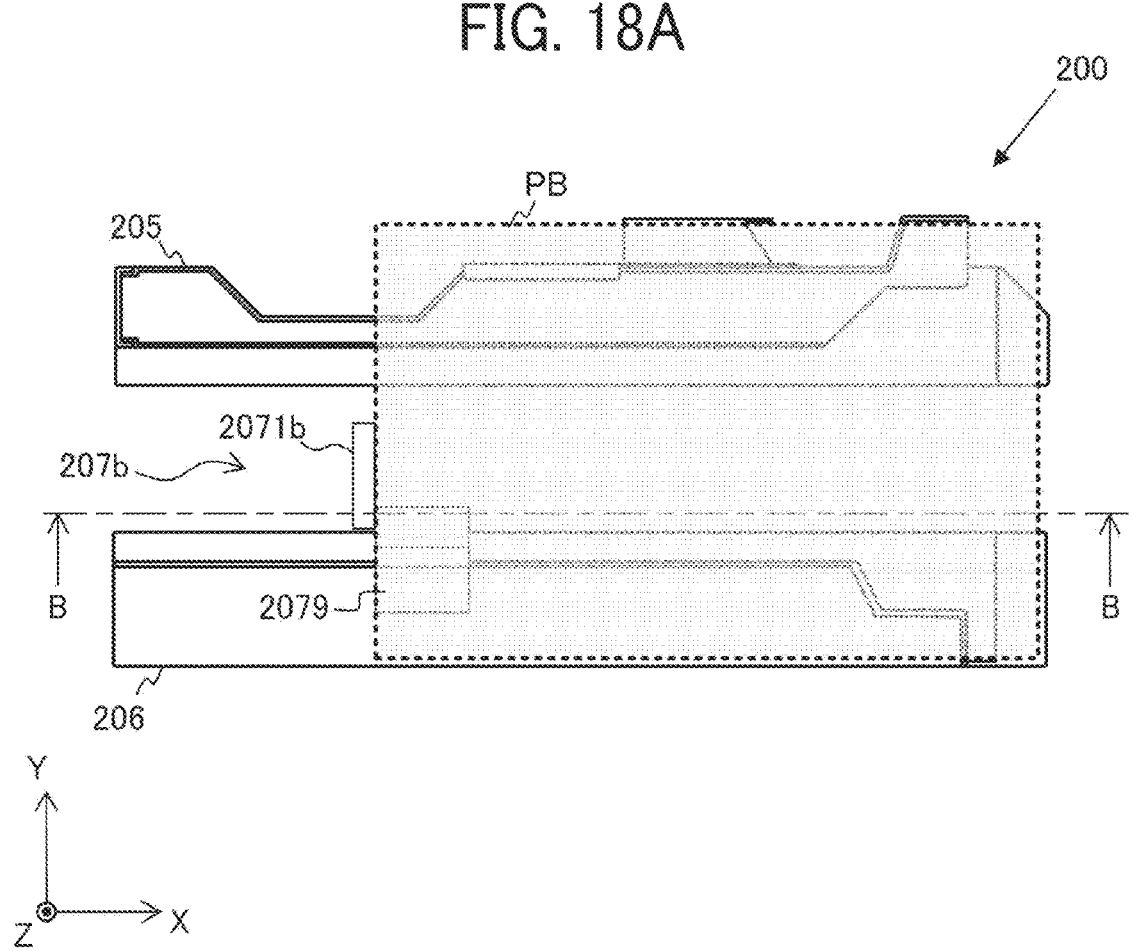
FIG. 18A is a top view of the leading end stopper according to the third embodiment of the present disclosure.
Figure 18B:
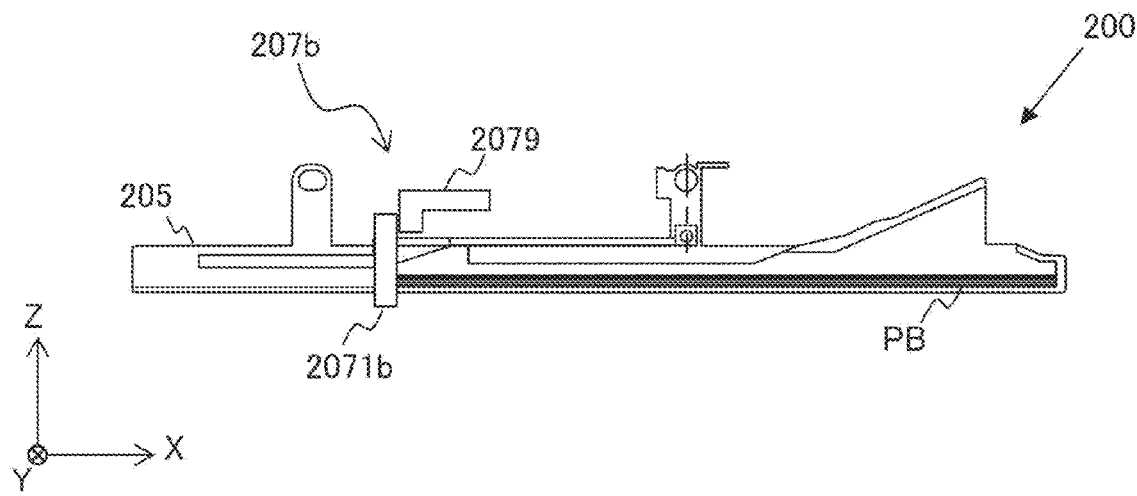
FIG. 18B is a side view of the leading end stopper according to the third embodiment of the present disclosure.

Next, a leading end stopper 207b according to a third embodiment as still another embodiment of the leading end stopper 207 is described. FIG. 17 is a perspective view of the leading end stopper 207b according to the third embodiment of the present disclosure. FIG. 18A is a top view of the sheet alignment apparatus 200 according to the present embodiment. FIG. 18B is a cross-sectional view of the sheet alignment apparatus 200 according to the present embodiment taken along line B-B of FIG. 18A.

The leading end stopper 207b according to the present embodiment includes two members, a contact portion 2071b and a parallel holder 2079. The contact portion 2071b is a slide aid and also a parallel moving member. The parallel holder 2079, as a holder, holds the contact portion 2071b in a state in which the contact portion 2071b is movable in parallel. In the leading end stopper 207b, the contact portion 2071b moves in a direction indicated by arrow H, which is parallel to the moving direction of the jogger fences 205 and 206, in conjunction of the movement of the jogger fences 205 and 206 to the stapling positions.

The side surface of the contact portion 2071b of the leading end stopper 207b is pressed by the jogger fence 206 moving to the stapling position. Accordingly, the contact portion 2071b is moved in parallel while being in contact with the leading end of the sheet bundle PB by the biasing force of the jogger fence 206. On the other hand, the jogger fence 205 returning from the stapling position to the sheet receiving position pushes the side surface of the contact portion 2071b on the opposite side and moves in parallel to return to the original position.

The leading end stopper 207b allows the sheet bundle PB to be moved while the contact portion 2071b is kept in contact with the leading end of the sheet bundle PB moved to the stapling position by the jogger fences 205 and 206. Therefore, even when the sheet bundle PB is moved to the stapling position and the binding processing is performed, the binding processing can be performed while the alignment of the leading end of the sheet bundle PB is maintained. Thus, the alignment accuracy of the sheet can be enhanced.

Fourth Embodiment

Figure 19:
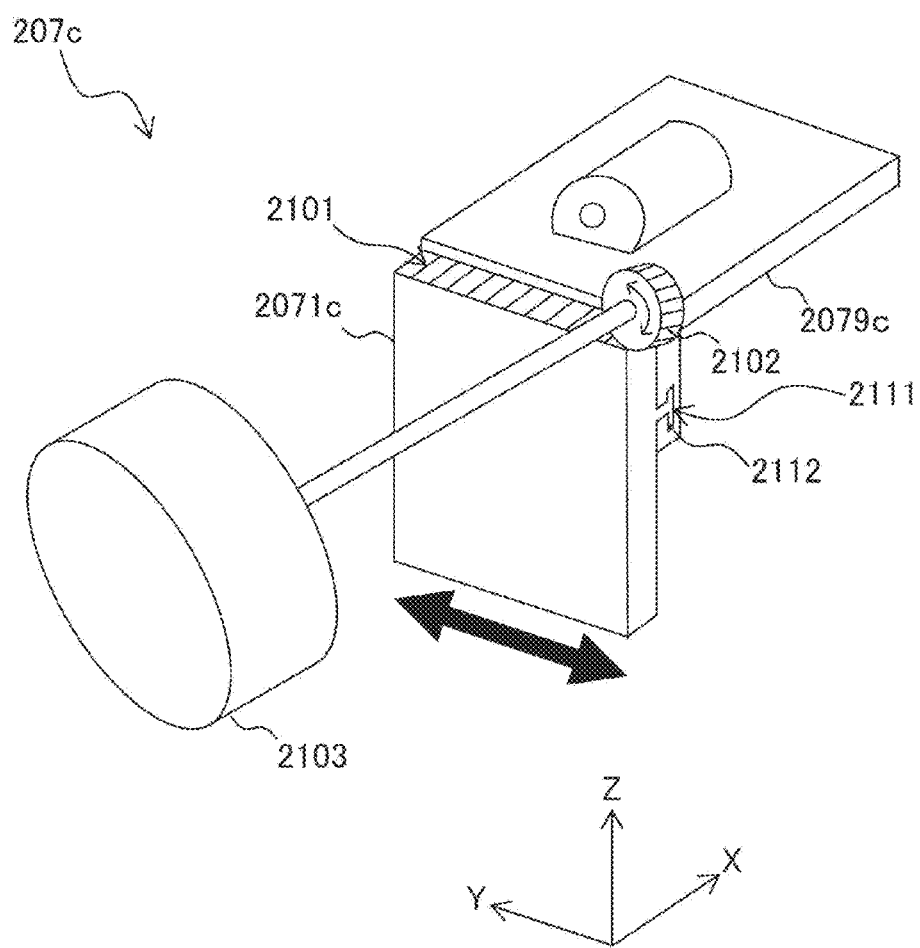
FIG. 19 is a perspective view of a configuration of a leading end stopper according to a fourth embodiment of the present disclosure.

Next, a leading end stopper 207c according to a fourth embodiment as still another embodiment of the leading end stopper 207 is described. FIG. 19 is a perspective view of the leading end stopper 207c according to the present embodiment. Similar to the leading end stopper 207b described above, the leading end stopper 207c includes two members, a contact portion 2071c and a parallel holder 2079c. The contact portion 2071c, to which a rack gear 2101 as a rack and pinion mechanism is provided, is held so as to be movable in parallel with respect to the parallel holder 2079c.

A pinion gear 2102 meshes with the rack gear 2101 provided on the contact portion 2071c. The pinion gear 2102 is rotationally driven by a leading end stopper drive source 2103. The driving of the leading end stopper driving source 2103 is controlled by the controller 260 included in the sheet alignment apparatus 200. In the present embodiment, the controller 260 controls driving of the leading end stopper driving source 2103 based on detection signals from position sensors that detect positions of the jogger fences 205 and 206.

In the parallel holder 2079c, a groove 2111 is formed in a part of a surface with which the contact portion 2071c comes into contact. The groove 2111 is a recess extending in the moving direction of the contact portion 2071c and is in a state of being inserted with a rail 2112 formed on the contact portion 2071c. The rail 2112 is slidable in a state of being fitted into the groove 2111. Thus, the contact portion 2071c can be kept in contact with the leading end of the sheet bundle PB even when the rail 2112 is moved in parallel by the leading end stopper driving source 2103.

That is, when the jogger fences 205 and 206 move to the stapling positions, the contact portion 2071c receives the driving force from the leading end stopper driving source 2103. Accordingly, the leading end stopper 207c moves in parallel at the same speed as the moving speed of the sheet bundle PB. Such a mechanism as described above allows the alignment state of the leading end of the sheet bundle PB to be maintained, even when the sheet bundle PB is moved to the stapling position. Thus, the alignment accuracy of the sheet can be enhanced.

Fifth Embodiment

Figure 20:
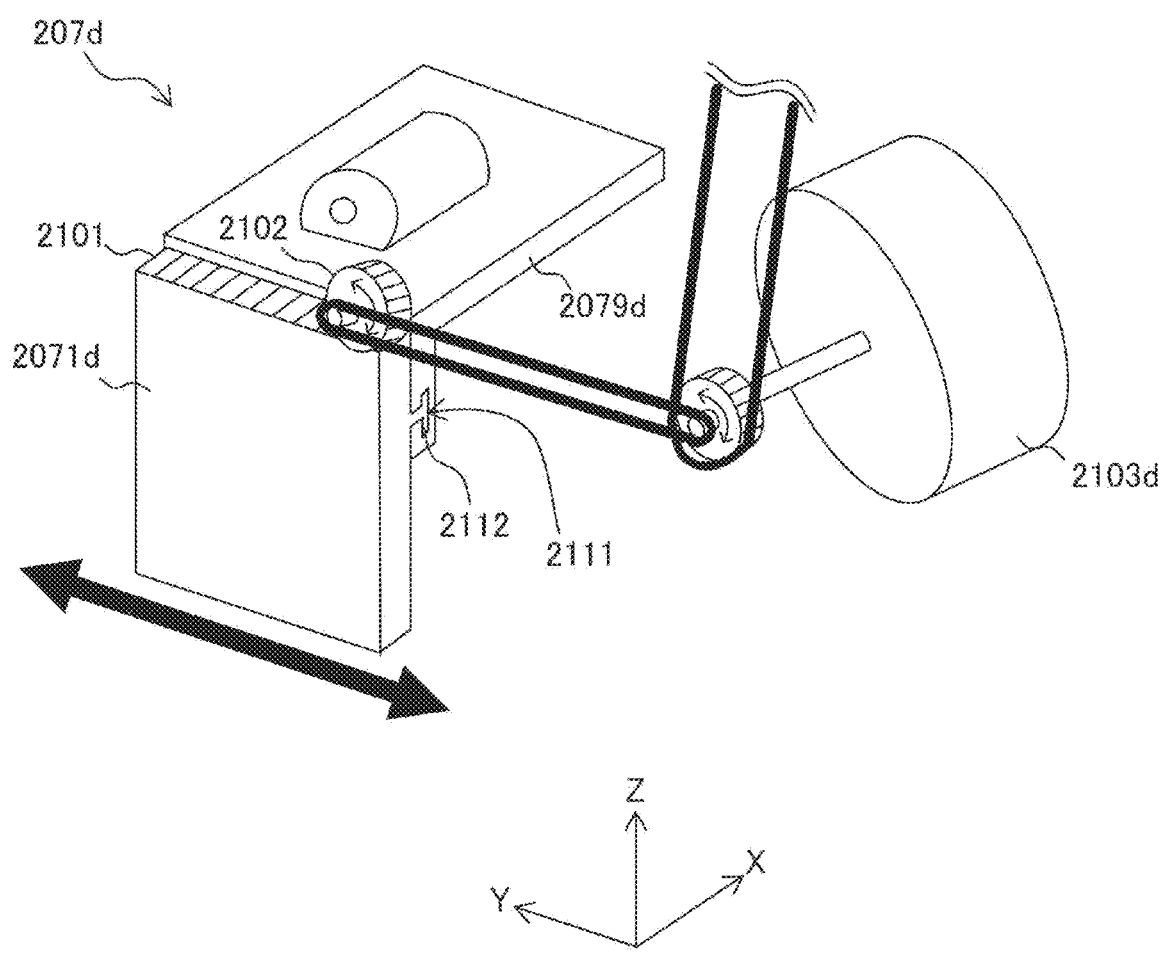
FIG. 20 is a perspective view of a configuration of a leading end stopper according to a fifth embodiment of the present disclosure.

Next, a leading end stopper 207d according to a fifth embodiment as still another embodiment of the leading end stopper 207 is described. FIG. 20 is a perspective view of the leading end stopper 207d according to the present embodiment. Similar to the leading end stopper 207c described above, the leading end stopper 207d includes two members, a contact portion 2071d and a parallel holder 2079d. The contact portion 2071d, to which the rack gear 2101 as the rack and pinion mechanism is provided, is held so as to be movable in parallel with respect to the parallel holder 2079d. The pinion gear 2102 meshes with the rack gear 2101 provided on the contact portion 2071d, and a power source 2103d is used as a supply source of the driving force of the pinion gear 2102. Accordingly, the contact portion 2071d is moved by the driving force from the power source 2103d.

The driving force from the power source 2103d is transmitted to the pinion gear 2102 via a belt driving mechanism. The pinion gear 2102 moves the rack gear 2101 in parallel by the driving force received from the belt driving mechanism. As a result, the contact portion 2071d moves in parallel. The power source 2103d is controlled by the controller 260. The controller 260 controls driving of the power source 2103d based on detection results from position sensors that detect the positions of the jogger fences 205 and 206.

When the jogger fences 205 and 206 move to the stapling positions, the contact portion 2071d of the leading end stopper 207d receives the driving force from the power source 2103d and moves in parallel at the same speed as the moving speed of the sheet bundle PB. Such a mechanism as described above allows the alignment state of the leading end of the sheet bundle PB to be maintained, even when the sheet bundle PB is moved to the stapling position. Thus, the alignment accuracy of the sheet can be enhanced.

Sixth Embodiment

Next, a leading end stopper 207e according to a sixth embodiment as still another embodiment of the leading end stopper 207 is described. FIGS. 21A, 21B, 22A, and 22B are perspective views of the leading end stopper 207e according to the present embodiment. Similar to the leading end stoppers 207b, 207c, and 207d described above, the leading end stopper 207e includes two members. In the leading end stopper 207e, a contact portion 2071e and a parallel holder 2079e are connected by a spring 2104 as an elastic member.

Figure 21A:
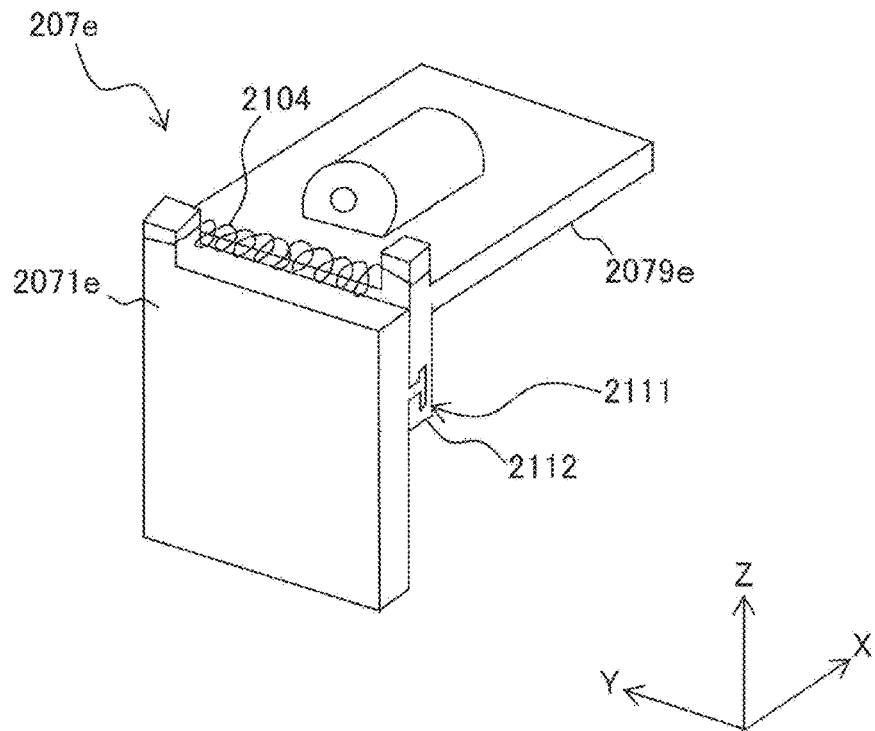
FIGS. 21A and 21B are perspective views of a leading end stopper illustrating an operation of the leading end stopper according to a sixth embodiment of the present disclosure.
Figure 21B:
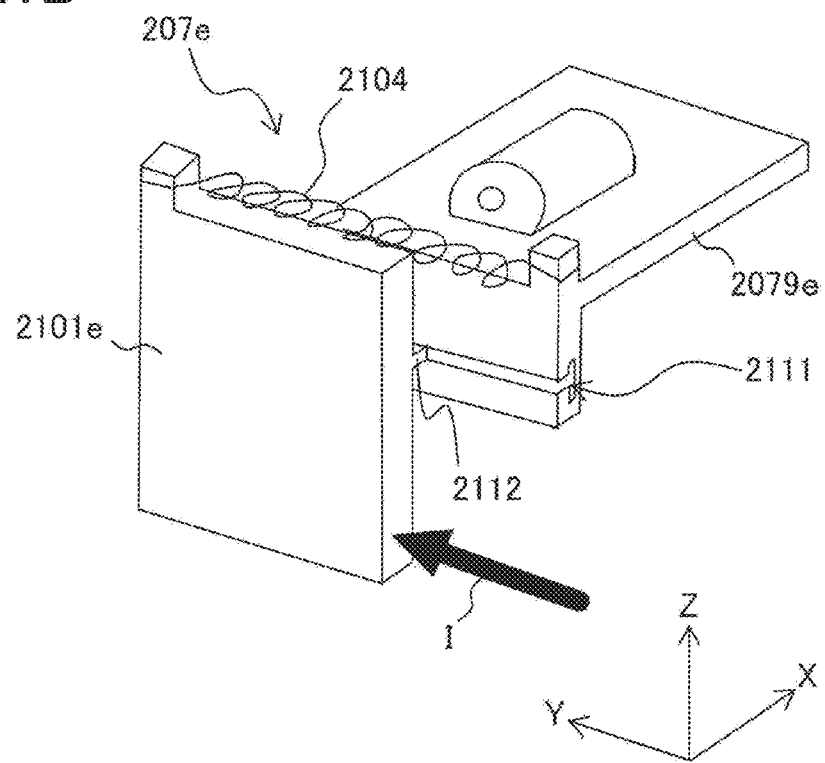

FIG. 21A illustrates the leading end stopper 207e when the jogger fences 205 and 206 start moving to the stapling position. At this time, the contact portion 2071e is biased by the spring 2104 to stay at the alignment position at which the leading end of the sheet bundle PB is aligned. In this state, when the jogger fences 205 and 206 move to the stapling position, as illustrated in FIG. 21B, the side surface of the contact portion 2071e is pressed by the jogger fence 206 and the contact portion 2071e moves parallel in a direction indicated by arrow I against the biasing force of the spring 2104. That is, the elastic force of the spring 2104 is set approximately to a magnitude that does not resist the moving force of the jogger fence 206.

Figure 22A:
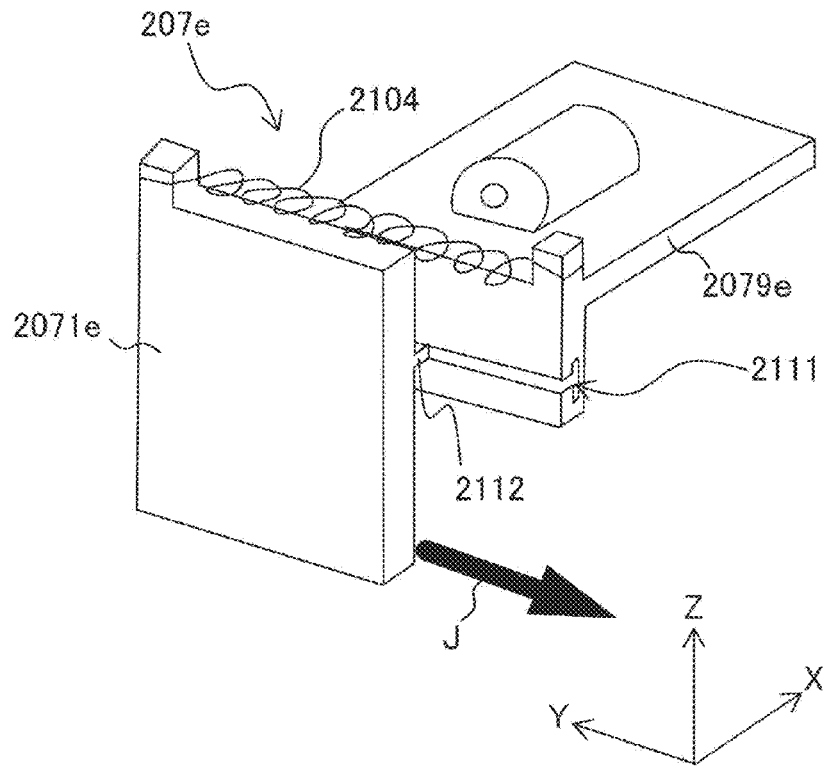
FIGS. 22A and 22B are perspective views of the leading end stopper illustrating an operation of the leading end stopper according to the sixth embodiment of the present disclosure.
Figure 22B:
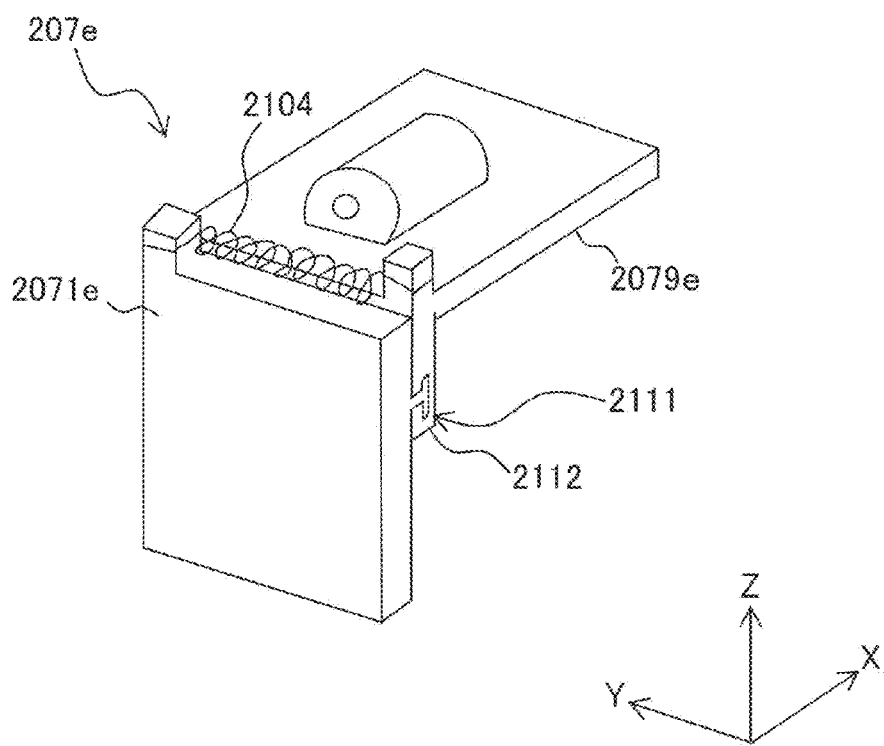

When the jogger fences 205 and 206 are moved to the stapling positions and the stapler 209 performs the binding processing at a predetermined position, the jogger fences 205 and 206 return to the sheet receiving positions. At this time, the force against the elastic force of the spring 2104 biasing the contact portion 2071e is weakened. At this time, as illustrated in FIG. 22A, the contact portion 2071e is moved in a direction indicated by arrow J by the elastic force of the spring 2104. Thereafter, when the jogger fences 205 and 206 return to the sheet receiving position, as illustrated in FIG. 22B, the contact portion 2071e also returns to the alignment position of the sheet bundle PB.

In a series of operations in which the jogger fences 205 and 206 move to the stapling positions and then return to the sheet receiving positions, the contact portion 2071e is pressed by the jogger fence 206 and moves due to the relationship between the elastic force of the spring 2104 and the biasing force of the jogger fence 206. Therefore, the leading end stopper 207e moves at the same speed as the moving speed of the jogger fence 206, that is, the moving speed of the sheet bundle PB. Thus, the leading end of the sheet bundle PB can be kept in contact with the leading end stopper 207e when the leading end stopper 207e moves to the stapling position.

Although the spring 2104 as the elastic member is described as an example in the present embodiment, a stretchable rubber may be used.

Seventh Embodiment

Figure 23A:
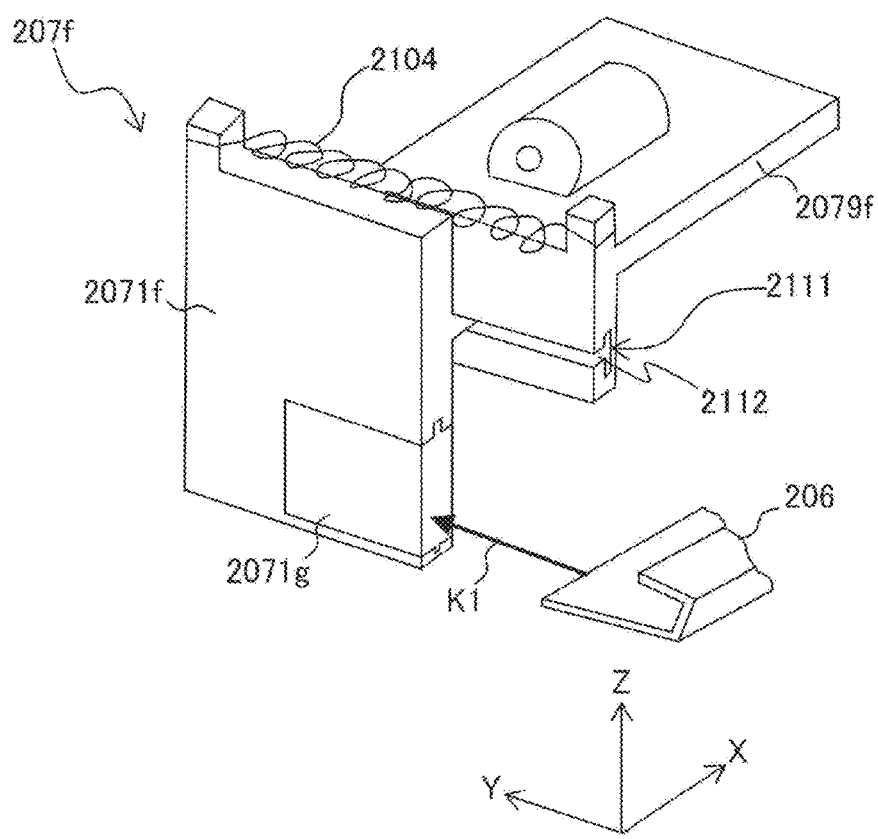
FIGS. 23A and 23B are schematic perspective views of a leading end stopper illustrating an operation of the leading end stopper according to a seventh embodiment of the present disclosure.
Figure 23B:
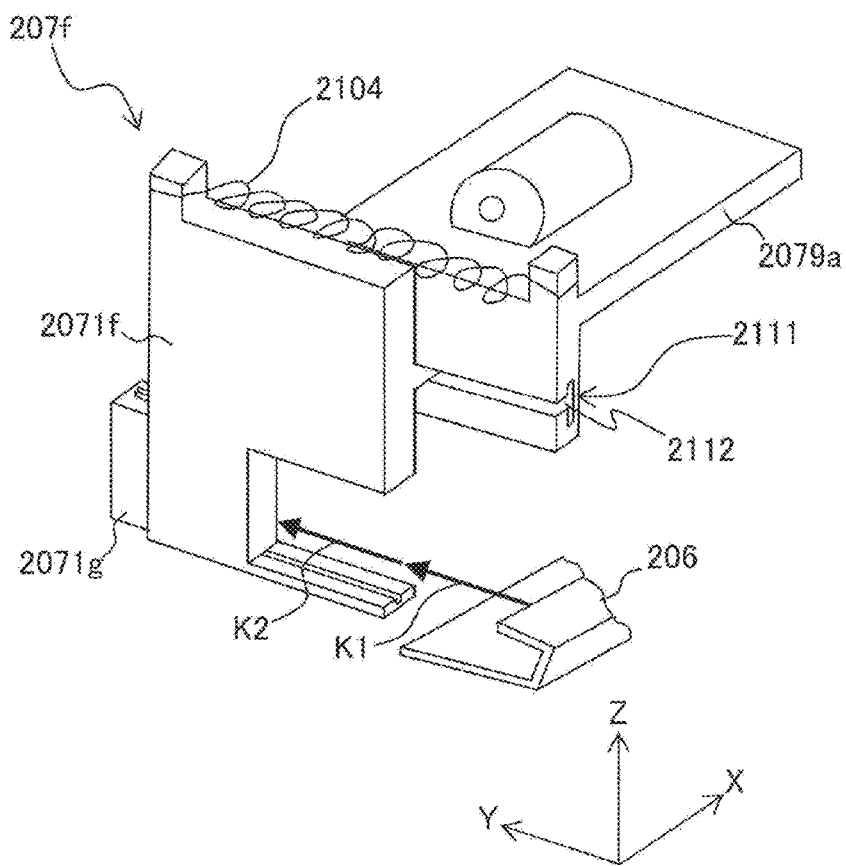

Next, a leading end stopper 207f according to a seventh embodiment as still another embodiment of the leading end stopper 207 is described. FIGS. 23A and 23B are perspective views of the leading end stopper 207f according to the present embodiment. The leading end stopper 207f includes a first contact portion 2071f and a second contact portion 2071g in addition to a configuration similar to that of the leading end stopper 207e described above.

As illustrated in FIGS. 23A and 23B, the first contact portion 2071f is connected to a parallel holder 2079f by a spring 2104 as an elastic member. The second contact portion 2071g includes a position at which the jogger fence 206 contacts the second contact portion 2071g when the second contact portion 2071g moves to the stapling position. The position corresponds to a portion of the first contact portion 2071f. Further, the second contact portion 2071g is connected to the first contact portion 2071f via an elastic member inside the first contact portion 2071f.

In the present embodiment, the spring constant of the spring 2104 is set to be smaller than the spring constant of the elastic member for connecting the second contact portion 2071g to the first contact portion 2071f. The first contact portion 2071f and the second contact portion 2071g are independently moved in parallel.

As illustrated in FIG. 23A, when the jogger fence 206 moves to the stapling position and presses the second contact portion 2071g, the first contact portion 2071f integrally connected with the second contact portion 2071g is first moved in parallel in a direction indicated by arrow K1.

Subsequently, when the spring 2104 reaches a position at which the spring 2104 is fully extended and further moves to the stapling position of the jogger fence 206, the second contact portion 2071g moves in parallel in a direction indicated by arrow K2 independently of the first contact portion 2071f (FIG. 23B).

Reversing the relationship between the spring constants of the two elastic members allows the second contact portion 2071g to be moved in parallel first, and then the first contact portion 2071f to be moved in parallel.

Therefore, in the leading end stopper 207f according to the present embodiment, the first contact portion 2071f and the second contact portion 2071g which are in contact with the leading end of the sheet bundle PB are moved in parallel at the same speed as the moving speed of the jogger fence 206. At this time, the leading end of the sheet bundle PB can be kept aligned. Thus, the accuracy of the sheet alignment can be enhanced.

The above-described embodiments may be implemented in combination with each other.

The present disclosure is not limited to specific embodiments described above, and numerous additional modifications and variations are possible in light of the teachings within the technical scope of the appended claims. It is therefore to be understood that, the disclosure of the present specification may be practiced otherwise by those skilled in the art than as specifically described herein. Such modifications and alternatives are within the technical scope of the present disclosure.

In the above descriptions, the term "printing" in the present disclosure may be used synonymously with, e.g. the terms of "image formation", "recording", "printing", and "image printing".

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

What is claimed is:

1. A sheet alignment apparatus comprising:
   a sheet leading-end aligning device configured to align a leading end of a sheet bundle in a sheet conveyance direction;
   a sheet side-end aligning device configured to align a side end of the sheet bundle in the sheet conveyance direction and move the sheet bundle to a set position; and
   a shaft disposed along the sheet conveyance direction and rotatably supporting the sheet leading-end aligning device,
   wherein the sheet leading-end aligning device is at a position at which the sheet leading-end aligning device interferes with the sheet side-end aligning device when the sheet side-end aligning device moves in a direction orthogonal to the sheet conveyance direction,
   wherein the sheet leading-end aligning device is configured to maintain contact with the leading end of the sheet bundle when the sheet leading-end aligning device retracts from a movement path of the sheet side-end aligning device along which the sheet side-end aligning device moves the sheet bundle to the set position, and
   wherein the sheet leading-end aligning device is configured to retract from the movement path of the sheet side-end aligning device by rotation around the shaft when the sheet side-end aligning device moves the sheet bundle to the set position.

2. The sheet alignment apparatus according to claim 1, wherein the sheet leading-end aligning device is configured to retract from the movement path of the sheet side-end aligning device, while contacting the leading end of the sheet bundle, by a biasing force of the sheet side-end aligning device moving to the set position.

3. The sheet alignment apparatus according to claim 1, wherein the sheet leading-end aligning device is configured to rotate in the direction orthogonal to the sheet conveyance direction by a biasing force of the sheet side-end aligning device while contacting the leading end of the sheet bundle to retract from the movement path of the sheet side-end aligning device.

4. The sheet alignment apparatus according to claim 1, wherein the sheet leading-end aligning device includes a rotating contact member configured to contact the leading end of the sheet bundle when the sheet leading-end aligning device rotates and retracts from the movement path of the sheet side-end aligning device.

5. The sheet alignment apparatus according to claim 1, wherein the sheet leading-end aligning device is configured to retract from the movement path of the sheet side-end aligning device at a same speed as a movement speed of the sheet side-end aligning device at which the sheet side-end aligning device moves the sheet bundle to the set position.

6. The sheet alignment apparatus according to claim 1, wherein the sheet leading-end aligning device is configured to stay by a magnetic force at a leading end alignment position at which the leading end of the sheet bundle is aligned, and to retract from the movement path of the sheet side-end aligning device by an external force against the magnetic force when the sheet side-end aligning device moves the sheet bundle to the set position.

7. The sheet alignment apparatus according to claim 1, wherein the sheet leading-end aligning device includes a slider configured to slide in contact with the leading end of the sheet bundle.

8. A post-processing apparatus comprising:
a binding device configured to bind a leading end of a sheet bundle; and
the sheet alignment apparatus according to claim 1, wherein
the sheet side-end aligning device is configured to align a side end of the sheet bundle on a side facing the binding device and move the sheet bundle to a binding position of the binding device.

9. An image forming system comprising:
an image forming device configured to form an image on a surface of a sheet; and
the post-processing apparatus according to claim 8,
wherein the post-processing apparatus is configured to perform post-processing on the sheet on which the image has been formed by the image forming device.

10. A sheet alignment apparatus, comprising:
a sheet leading-end aligning device configured to align a leading end of a sheet bundle in a sheet conveyance direction; and
a sheet side-end aligning device configured to align a side end of the sheet bundle in the sheet conveyance direction and move the sheet bundle to a set position,
wherein the sheet leading-end aligning device is configured to maintain contact with the leading end of the sheet bundle when the sheet leading-end aligning device retracts from a movement path of the sheet side-end aligning device along which the sheet side-end aligning device moves the sheet bundle to the set position, and
wherein the sheet leading-end aligning device is configured to be biased by the sheet side-end aligning device while contacting the leading end of the sheet bundle and to move in parallel in a moving direction of the sheet side-end aligning device to retract from the movement path of the sheet side-end aligning device.

11. The sheet alignment apparatus according to claim 10, wherein the sheet leading-end aligning device includes:
a parallel moving member configured to be biased by the sheet side-end aligning device to move in parallel; and
a holder configured to movably hold the parallel moving member.

12. The sheet alignment apparatus according to claim 11, further comprising a rack and pinion mechanism configured to move the parallel moving member in parallel with respect to the holder.

13. The sheet alignment apparatus according to claim 11, further comprising a belt driving mechanism configured to move the parallel moving member in parallel with respect to the holder.

14. The sheet alignment apparatus according to claim 11, further comprising an elastic member configured to move the parallel moving member in parallel with respect to the holder.

15. The sheet alignment apparatus according to claim 11, wherein the parallel moving member is configured to move in parallel only a part of a contact portion of the parallel moving member that contacts the leading end of the sheet bundle.

* * * * *